(12) United States Patent
Borenstein

(10) Patent No.: US 11,163,898 B2
(45) Date of Patent: Nov. 2, 2021

(54) SHARING ARTIFACTS IN PERMISSION-PROTECTED ARCHIVES

(71) Applicant: Mimecast Services Ltd., London (GB)

(72) Inventor: Nathaniel S. Borenstein, Greenbush, MI (US)

(73) Assignee: Mimecast Services Ltd., London (GB)

(*) Notice: Subject to any disclaimer, the term of this patent is extended or adjusted under 35 U.S.C. 154(b) by 585 days.

(21) Appl. No.: 14/024,297

(22) Filed: Sep. 11, 2013

(65) Prior Publication Data
US 2015/0074819 A1    Mar. 12, 2015

(51) Int. Cl.
*G06F 16/17*     (2019.01)
*G06F 16/174*    (2019.01)
*G06F 16/176*    (2019.01)
*G06F 21/62*     (2013.01)
*G06F 16/21*     (2019.01)
(Continued)

(52) U.S. Cl.
CPC .......... *G06F 21/6218* (2013.01); *G06F 16/17* (2019.01); *G06F 16/174* (2019.01); *G06F 16/176* (2019.01); *G06F 16/183* (2019.01); *G06F 16/211* (2019.01); *G06F 16/213* (2019.01); *G06F 16/9035* (2019.01); *G06F 21/6227* (2013.01); *G06F 21/6245* (2013.01); *G06F 2221/2113* (2013.01); *G06F 2221/2141* (2013.01); *H04L 63/101* (2013.01)

(58) Field of Classification Search
CPC .......... G06F 21/31; G06F 12/00; G06F 17/30; G06F 21/62; G06F 2221/2141; G06F 17/30964; G06F 21/30; G06F 21/57; G06F 17/30867; G06F 21/6218; G06F 16/258; G06F 17/194; G06F 16/211; G06F 16/212; G06F 16/176; G06F 16/13; G06F 16/17; G06F 16/174; H04L 63/10; G06Q 10/06; Y10S 707/99932; Y10S 707/99933; Y10S 707/99939
USPC ................ 707/705, 709, 769, 780, E17.108, 707/999.001, 999.003
See application file for complete search history.

(56) References Cited

U.S. PATENT DOCUMENTS 5,910,987 A * 6/1999 Ginter .................. G06Q 20/102
                                                       705/52
6,965,968 B1    11/2005 Touboul
(Continued)

FOREIGN PATENT DOCUMENTS

WO    WO 2013/056032    4/2013
WO    WO 2015/038518    3/2015

OTHER PUBLICATIONS

International Search Report and Written Opinion for App. Ser. No. PCT/US14/54709, dated Dec. 4, 2014, 14 pages.
(Continued)

*Primary Examiner* — Tamara T Kyle
*Assistant Examiner* — Berhanu Mitiku
(74) *Attorney, Agent, or Firm* — Nutter McClennen & Fish LLP

(57) ABSTRACT

Among other things, we describe techniques for receiving a list of artifacts that are stored in an archive and are responsive to a search query issued by an entity. A set of artifacts are identified that each have a permission attribute indicating that the respective artifact is accessible to the entity when the respective artifact is responsive, above a threshold responsiveness value, to the search query issued by the entity.

18 Claims, 10 Drawing Sheets

(51) Int. Cl.
*G06F 16/9035* (2019.01)
*G06F 16/182* (2019.01)
*H04L 29/06* (2006.01)

(56) References Cited

U.S. PATENT DOCUMENTS

| | | | |
|---|---|---|---|
| 7,058,822 | B2 | 6/2006 | Edery et al. |
| 7,065,433 | B2 | 6/2006 | Basu et al. |
| 7,349,862 | B2 | 3/2008 | Palmer et al. |
| 7,383,252 | B2 | 6/2008 | Soogoor |
| 7,418,731 | B2 | 8/2008 | Touboul |
| 7,647,633 | B2 | 1/2010 | Edery et al. |
| 7,870,279 | B2 | 1/2011 | Chuang et al. |
| 8,141,154 | B2 | 3/2012 | Gruzman et al. |
| 8,656,056 | B2 | 2/2014 | Bennett et al. |
| 8,694,533 | B2 | 4/2014 | Oztaskent et al. |
| 9,009,220 | B2 | 4/2015 | Borenstein |
| 10,277,628 | B1 | 4/2019 | Jakobsson |
| 10,609,073 | B2 | 3/2020 | Jakobsson |
| 2002/0065673 | A1 | 5/2002 | Rooke |
| 2003/0033431 | A1 | 2/2003 | Shinomiya |
| 2003/0046383 | A1 | 2/2003 | Lee et al. |
| 2003/0043178 | A1 | 3/2003 | Gusler et al. |
| 2003/0088657 | A1 | 5/2003 | Eggers |
| 2004/0006617 | A1 | 1/2004 | Hikida et al. |
| 2004/0221234 | A1* | 11/2004 | Imai .......... H04L 63/0428 715/256 |
| 2005/0064820 | A1 | 3/2005 | Park et al. |
| 2005/0234904 | A1* | 10/2005 | Brill ............ G06F 17/30675 |
| 2005/0267868 | A1 | 12/2005 | Liebl et al. |
| 2006/0031584 | A1 | 2/2006 | McKinley et al. |
| 2006/0089323 | A1* | 4/2006 | Barik .......... A61P 11/00 514/44 A |
| 2006/0155560 | A1 | 7/2006 | Chien |
| 2006/0184536 | A1 | 8/2006 | Jreij et al. |
| 2007/0168464 | A1 | 7/2007 | Noonan et al. |
| 2007/0174069 | A1 | 7/2007 | Moore, Jr. et al. |
| 2007/0198635 | A1 | 8/2007 | Lindner et al. |
| 2008/0028028 | A1 | 1/2008 | Chismark |
| 2008/0133654 | A1 | 6/2008 | Kim et al. |
| 2008/0168132 | A1 | 7/2008 | Chun |
| 2008/0168135 | A1 | 7/2008 | Redlich et al. |
| 2008/0172457 | A1 | 7/2008 | Chen et al. |
| 2008/0250100 | A1 | 10/2008 | Hatanaka et al. |
| 2008/0250101 | A1 | 10/2008 | Tanaka et al. |
| 2009/0089323 | A1* | 4/2009 | Yoshihama ........ G06F 16/93 |
| 2009/0094319 | A1 | 4/2009 | Lee et al. |
| 2009/0094321 | A1 | 4/2009 | Ueda et al. |
| 2009/0133040 | A1 | 5/2009 | Stevens, IV |
| 2009/0164888 | A1 | 6/2009 | Phan |
| 2009/0187540 | A1 | 7/2009 | Richardson et al. |
| 2009/0193016 | A1* | 7/2009 | Jones ............ G06F 21/6218 |
| 2009/0248490 | A1 | 10/2009 | Moncreiff |
| 2009/0265420 | A1 | 10/2009 | Hansen et al. |
| 2009/0307054 | A1 | 12/2009 | D'Imporzano et al. |
| 2010/0027552 | A1 | 2/2010 | Hill |
| 2010/0030792 | A1 | 2/2010 | Swinton et al. |
| 2010/0036836 | A1 | 2/2010 | Stephens, Jr. |
| 2010/0082532 | A1 | 4/2010 | Shaik et al. |
| 2010/0114899 | A1 | 5/2010 | Guha et al. |
| 2010/0185650 | A1* | 7/2010 | Topatan .......... G06F 17/30011 707/769 |
| 2010/0235355 | A1 | 9/2010 | Carter et al. |
| 2010/0293147 | A1 | 11/2010 | Snow et al. |
| 2010/0332401 | A1 | 12/2010 | Prahlad et al. |
| 2010/0332543 | A1 | 12/2010 | Feng et al. |
| 2011/0010343 | A1 | 1/2011 | Chavda et al. |
| 2011/0055264 | A1 | 3/2011 | Sundelin et al. |
| 2011/0093471 | A1 | 4/2011 | Brockway et al. |
| 2011/0295844 | A1* | 12/2011 | Sun .......... G06F 16/345 707/723 |
| 2012/0167197 | A1* | 6/2012 | Kruger .......... G06F 21/62 726/16 |
| 2012/0173535 | A1* | 7/2012 | Ramakrishnan ...... G06F 21/604 707/741 |
| 2013/0097203 | A1* | 4/2013 | Bhattacharjee ....... G06F 21/604 707/783 |
| 2013/0097221 | A1 | 4/2013 | Borenstein |
| 2013/0297519 | A1 | 11/2013 | Brestoff et al. |
| 2015/0180747 | A1 | 6/2015 | Borenstein |

OTHER PUBLICATIONS

U.S. Appl. No. 13/273,696, filed Oct. 14, 2011.
U.S. Appl. No. 13/273,696.
BeyeNETWORK: Business Intelligence in the Cloud—A Spotlight Q&A with Dwight deVera of arcplan (originally published Oct. 10, 2011) [online], [retrieved on Oct. 13, 2011]. Retrieved from the Internet: http://www.b-eye-network.com/view/15545, 8 pages.
BusinessIntelligence.com: Latest News [online], [retrieved on Oct. 13, 2011]. Retrieved from the Internet: http://businessintelligence.com/, 2 pages.
Cloud Computing Topics: Business Intelligence in the Cloud (Sep. 20, 2011) [online], [retrieved on Oct. 13, 2011]. Retrieved from the Internet: http://cloudcomputingtopics.com/2011/09/business-intelligence-in-the-cloud/, 2 pages.
Engadget: CloudSight Search gives you instant, unified access to email and social networking archives (Mar. 19, 2011) [online], [retrieved on Oct. 13, 2011]. Retrieved from the Internet: http://www.engadget.com/2011/03/09/cloudsight-search-gives-you-instant-unified-access-to-email-and/, 5 pages.
GoodData: Features (2011) [online], [retrieved on Oct. 13, 2011]. Retrieved from the Internet: http://www.gooddata.com/what-is-gooddata/features, 2 pages.
IBM: Business Analytics Software [online], [retrieved on Oct. 14, 2011]. Retrieved from the Internet: http://www-01.ibm.com/software/analytics/business-intelligence.html, 2 pages.
IBM: Information Archive for Email, Files and eDiscovery [online], [retrieved on Oct. 13, 2011]. Retrieved from the Internet: http://www-01.ibm.com/software/data/smart-archive/email-ediscovery.html, 2 pages.
Information Builders: Business Intelligence [online], [retrieved on Oct. 13, 2011]. Retrieved from the Internet: http://www.informationbuilders.com/business-intelligence, 2 pages.
Jaspersoft: Cloud BI [online], [retrieved on Oct. 13, 2011]. Retrieved from the Internet: http://www.jaspersoft.com/cloud, 1 page.
Micro Strategy: Alertive and Proactive Notification [online], [retrieved on Oct. 13, 2011]. Retrieved from the Internet: http://www.microstrategy.co.uk/bi-applications/5Styles/alerts.asp, 1 page.
Microsoft: Business Intelligence Overview [online], [retrieved on Oct. 13, 2011]. Retrieved from the Internet: http://www.microsoft.com/BI/en-us/Solutions/Pages/Product%20Overview.aspx, 3 pages.
Norwell: Proactive Reporting [online], [retrieved on Oct. 13, 2011]. Retrieved from the Internet: http://www.norwel.co.uk/news/Proactive-Reporting.html, 2 pages.
Odin Solutions: Proactive Reporting [online], [retrieved on Oct. 13, 2011]. Retrieved from the Internet: http://www.odinsol.com/support/reporting.shtml, 1 page.
Oracle: Business Intelligence Publisher Overview [online], [retrieved on Oct. 13, 2011]. Retrieved from the Internet: http://www.oracle.com/technetwork/middleware/bi-publisher/overview/index.html, 2 pages.
Rasmussen et al. "Financial Business Intelligence—Trends, Technology, Software Selection, and Implementation" [online] Dated 2002. [Retrieved on Mar. 11, 2013] Retrieved from the Internet <URL: http://cs5937.userapi.com/u11728334/docs/677dd96d976c/Nils_Rasmussen_Financial_Business_Intelligenc.pdf>, entire document, especially p. 76, para 1, 2; p. 77, para 2 to p. 79, para 1; p. 91, para 2; p. 96, para 2; p. 105, last para to p. 106, para 1; p. 151, para 6.
Realtalk: Useful & pro-active reporting [online], [retrieved on Oct. 13, 2011]. Retrieved from the Internet: http://www.norwel.co.uk/news/Proactive-Reporting.html, 1 page.
VentureBeat: Demo: We Are Cloud brings Business Intelligence to the masses (Sep. 13, 2011) [online], [retrieved on Oct. 13, 2011]. Retrieved from the Internet: http://venturebeat.com/2011/09/13/demo-we-are-cloud-brings-business-intelligence-to-the-masses/, 4 pages.
Wikipedia: Business Intelligence [online], [retrieved on Oct. 13,

(56) References Cited

OTHER PUBLICATIONS

2011]. Retrieved from the Internet: http://en.wikipedia.org/wild/Business_intelligence, 10 pages.
ZL Technologies Inc.: ZL Unified Archiving in the Cloud [online], [retrieved on Oct. 13, 2011]. Retrieved from the Internet: http://www.zlt.com/products-services/zl-unified-archiving-cloud, 2 pages.
International Search Report and Written Opinion for App. Ser. No. PCT/US12/59930, dated Apr. 15, 2013, 13 pages.
Application, pending claims and PAIR Transaction History for U.S. Appl. No. 13/273,696, filed Oct. 14, 2011.
International Preliminary Report on Patentability for App. Ser. No. PCT/US2012/59930, dated Apr. 15, 2014, 11 pages.
L. Giuri and Pietro, "Role templates for content-based access control," Proceedings of the Second ACM Workshop on Role-Based Access Control. RBAC '97, 153-159, Nov. 6, 1997.
Sebastian Monte, "Access control based on content," May 5, 2010, retrieved from the Internet: URL:http://www.cse.tkk.fi/en/publications/B/10/papers/Monte final.pdf.
Extended Search Report issued in EP Application No. 14844515.8 dated Jul. 13, 2016.

\* cited by examiner

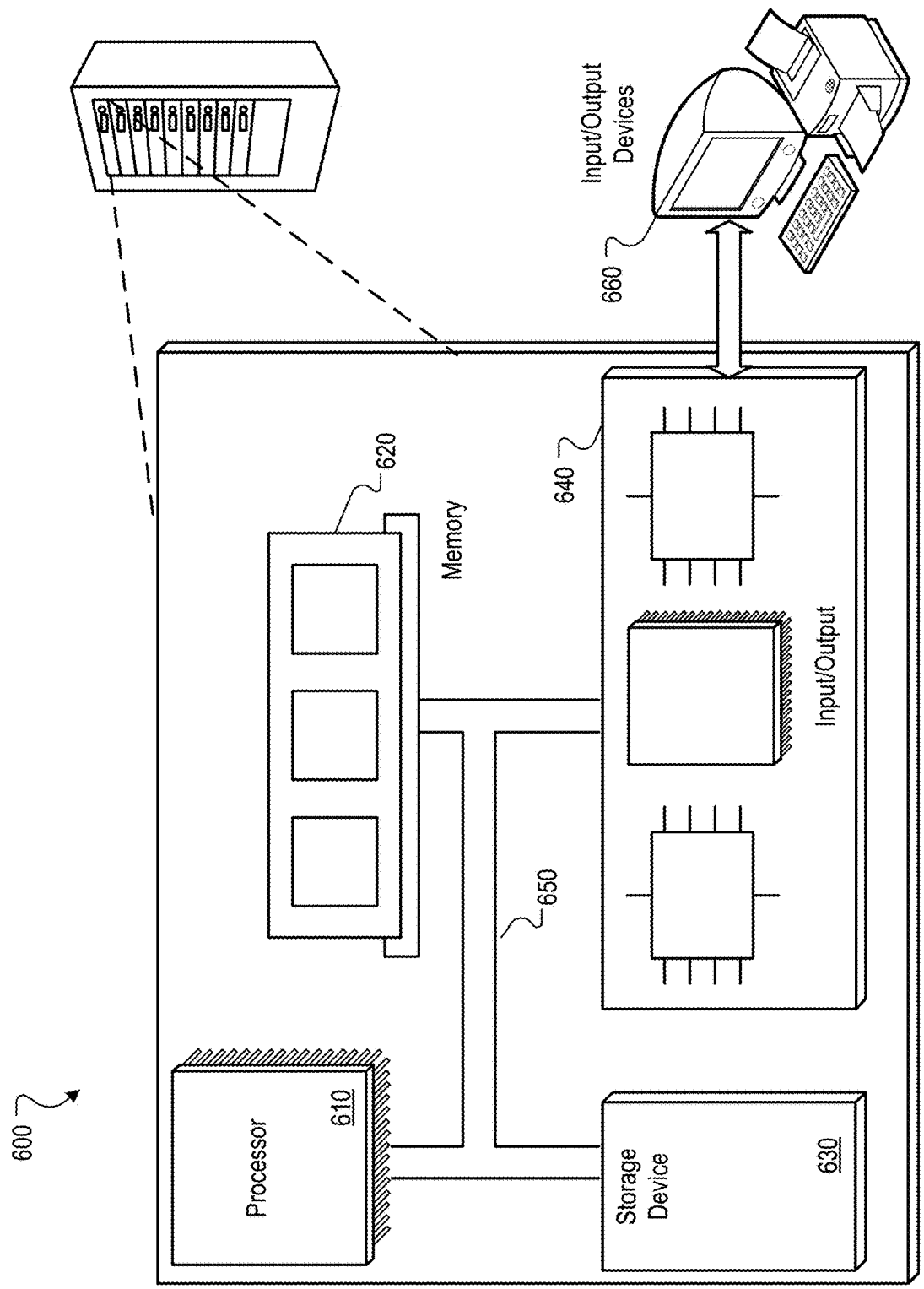

SHARING ARTIFACTS IN PERMISSION-PROTECTED ARCHIVES

BACKGROUND

This description relates to sharing artifacts in permission-protected archives. Computer systems can be used to store artifacts (e.g., portions of data) in an archive. In some cases, an archive can be associated with permissions that control access to the artifacts.

SUMMARY

The sharing artifacts in permission-protected archive that we describe here may encompass one or more of the following (and other) aspects, features, and implementations, and combinations of them.

In general, in an aspect, a method includes receiving a list of artifacts stored in an archive, the artifacts being responsive to a search query issued by an entity, and identifying, among the list of artifacts, a set of artifacts each having a permission attribute indicating that the respective artifact is accessible to the entity when the respective artifact is responsive, above a threshold responsiveness value, to the search query issued by the entity.

Implementations of this aspect may include one or more of the following features. Identifying a set of artifacts includes identifying, among the list of artifacts, an initial set of artifacts each having a permission attribute indicating that the respective artifact is not accessible to the entity, determining that one or more artifacts of the initial set of artifacts are responsive, above the threshold responsiveness value, to the search query, where the one or more artifacts each having the permission attribute indicating that the respective artifact is accessible to the entity when the respective artifact is responsive, above the threshold responsiveness value, to the search query, and in response to determining that the one or more artifacts are responsive, above the threshold responsiveness value, to the search query, identifying the one or more artifacts as the set of artifacts each having a permission attribute indicating that the respective artifact is accessible to the entity. The respective artifact includes an electronic message. The permission attribute includes a header field of the electronic message. This aspect includes determining whether a particular artifact of the list of artifacts meets or exceeds the threshold responsiveness value, the determination based on a responsiveness score determined by a search engine to which the search query was provided. This aspect includes determining the threshold responsiveness value based on a permission value associated with the permission attribute. This aspect includes making the set of artifacts available to the entity. This aspect includes making a request to a second entity to give permission to the entity to access a particular artifact of the set of artifacts, the second entity identified as an authorizing entity of the particular artifact. This aspect includes receiving a response from the second entity granting the permission to the entity to access the particular artifact, and making the particular artifact available to the entity. This aspect includes receiving a response from the second entity denying the permission to the entity to access the particular artifact, and removing the particular artifact from the set of artifacts. This aspect includes receiving, from an authorizing entity of a particular artifact, a request to modify a permission attribute of the particular artifact, and modifying the permission attribute of the particular artifact, where the modified permission attribute indicates that the particular artifact is accessible to the entity when the particular artifact is responsive, above the threshold responsiveness value, to the search query issued by the entity. This aspect includes receiving, from an authorizing entity of multiple artifacts sharing a common attribute, a request to modify a permission attribute of the multiple artifacts, and modifying the permission attribute of the multiple artifacts, where the modified permission attribute indicates that one or more artifacts of the multiple artifacts are accessible to the entity when the one or more artifacts are responsive, above the threshold responsiveness value, to the search query issued by the entity. The common attribute includes an artifact folder searchable by the entity.

In general, in another aspect, a system includes a storage system storing a portion of data associated with a permission attribute, the permission attribute indicating one or more of several permission states, the permission states including a) making the portion of data available to an entity when the entity is browsing a file system, and b) making the portion of data available to an entity when the entity performs a search query to which the portion of data is responsive.

In general, in another aspect, a method includes after identifying that a first artifact is responsive, above a threshold responsiveness value, to a particular search query issued by a searching entity, the first artifact having a permission attribute that indicates the first artifact is accessible to an entity when (i) the first artifact is responsive, above the threshold responsiveness value, to a search query issued by the entity, and (ii) permission to access is granted by an authorizing entity of the first artifact: receiving, by the authorizing entity, a request to grant permission to the searching entity to access the first artifact, where the first artifact is responsive, above the threshold responsiveness value, to the particular search query issued by the searching entity, and sending a response, by the authorizing entity, granting the permission to the searching entity to access the first artifact.

Implementations of this aspect may include one or more of the following features. Sending a response granting the permission to the searching entity to access the first artifact includes sending the response granting permission to the searching entity to access one or more other artifacts of the authorizing entity having the permission attribute. This aspect includes sending a request, by the authorizing entity, specifying the threshold responsiveness value associated with the permission attribute of the first artifact.

In general, in another aspect, a method includes in response to issuing a particular search query, receiving access to a first artifact having a permission attribute indicating that the first artifact is accessible to an entity when (i) the first artifact is responsive, above a threshold responsiveness value, to a search query issued by the entity, and (ii) permission to access is granted by an authorizing entity of the particular artifact, where the first artifact is responsive, above the threshold responsiveness value, to the particular search query, and where the authorizing entity has granted the permission to access the first artifact.

Implementations of this aspect may include one or more of the following features. This aspect includes receiving access to a second artifact having a permission attribute indicating that the second artifact is accessible to an entity when the second artifact is responsive, above a threshold responsiveness value, to a search query issued by the entity, where the second artifact is responsive, above the threshold responsiveness value, to the particular search query.

These and other aspects, features, and implementations, and combinations of them, may be expressed as apparatus, methods, methods of doing business, means or steps for performing functions, components, systems, program products, and in other ways.

Other aspects, features, and advantages will be apparent from the description and the claims.

BRIEF DESCRIPTION OF THE FIGURES

FIG. 6 is a block diagram of an example computer system.

DETAILED DESCRIPTION

Figure 1:
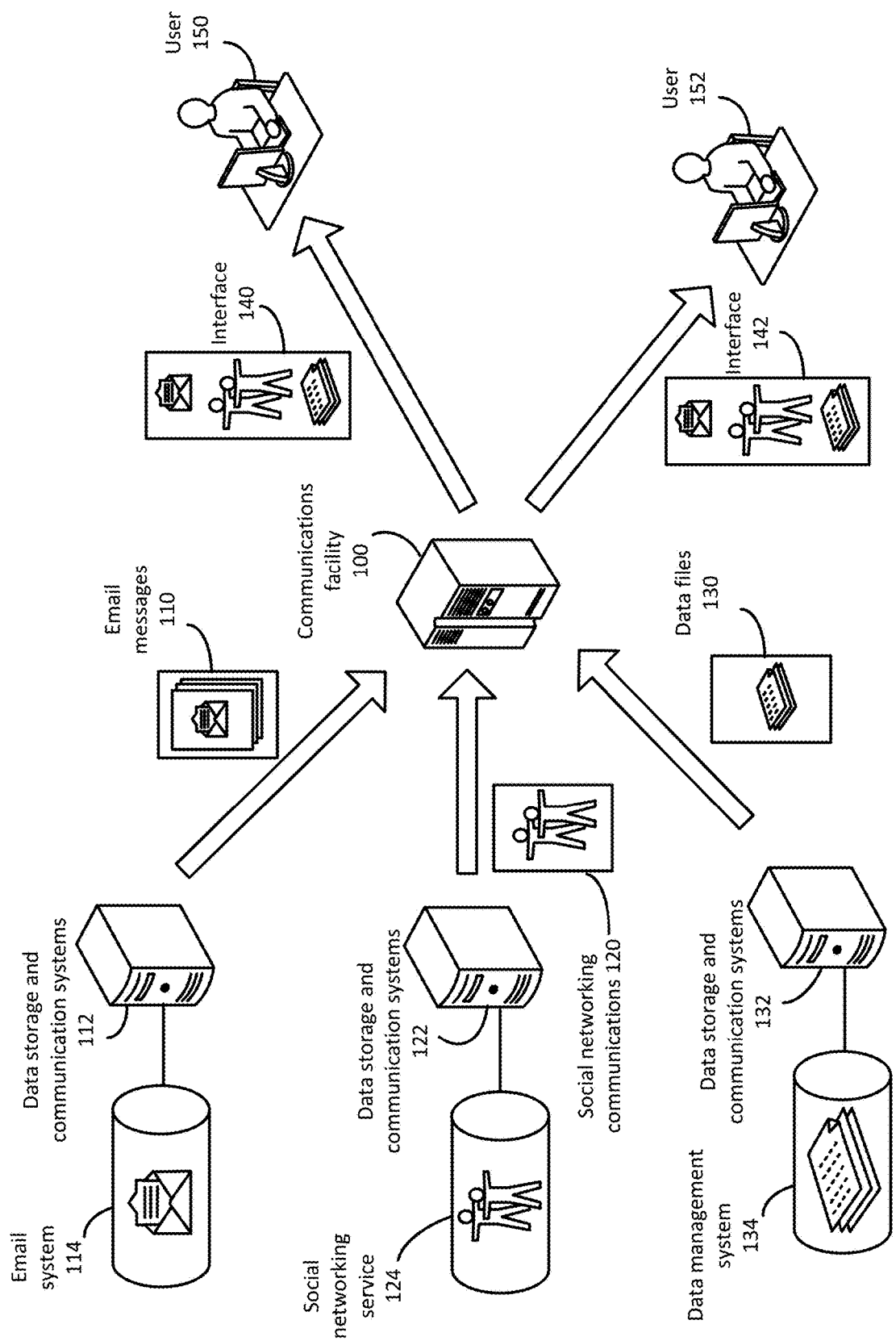
FIG. 1 is a block diagram of an example system that allows users to interact with artifacts.

When a user searches for artifacts (e.g., documents, emails, or other portions of data) in an archive, the user may typically only search artifacts owned by the user, artifacts identified by their permission attributes as accessible to the user, or artifacts identified by their permission attributes as publicly accessible. In some implementations, the search algorithm may identify one or more of highly relevant and potentially useful artifacts that are private to a different entity (e.g., private data of a different user), but these private artifacts are not made available to, or presented to the searching user because the user does not have permission to access these private artifacts.

To enhance information sharing in permission-protected archives, a new type of permission attribute, "search permission," may be used to identify private artifacts that are only accessible to other users if a trusted search algorithm has determined these private artifacts to be highly relevant to a search performed by another user.

Electronic communication applications enable entities to communicate using electronic facilities such as computer systems. Electronic communication applications and other electronic communicating facilities can fall under one or more of several broad categories, including email, social networking, and file management. Each of these categories is usually associated with a set of features typical of its category.

Email applications, for example, usually include functionality for sending and receiving discrete electronic messages addressed to one or more recipients. By discrete electronic messages, we mean that each message is a complete communication, and a system delivering an electronic message does not need any information derived from any other message to deliver the message. Other types of electronic messaging systems other than email systems may send and receive messages that are not discrete. Social networking applications usually include functionality for identifying relationships among users of a social networking application and relationships among communications made available to users of the social networking application. File management applications usually include functionality for creating, viewing, and editing files of one or more file types.

These categories of applications typically have underlying systems with which they allow a user to interact.

For example, an email application running on a user device allows a user to interact with an email system, which carries out the actions of sending and receiving messages sent to and from a variety of users on a variety of client computer systems (e.g., personal computers, smart phones, tablet computers, and other types of computer systems). An email system may run on a server or servers and provide the services to email applications running on clients. An email system typically operates according to standardized email protocols for sending and receiving messages. Typical email protocols include SMTP, POP3, and IMAP. In some implementations, an email system may include a User Agent, a Message Store, and a Message Transport Agent. The User Agent may be configured to interact with the user and communicate with the Message Store and the Message Transport Agent. The Message Store may be configured to manage the local storage and retrieval of messages that the user has sent or received. The Message Transport Agent may be configured to handles the delivery and receipt of emails to and from other sites.

As another example, a social networking application allows a user to interact with a social networking service, which, among other things, maintains associations between users of the social networking service and content provided to the social networking service. Social networking services typically allow users to establish and maintain user profiles of information about themselves.

In some implementations, social networking services identify relationships between users of the service, and the relationships are maintained independent of data in any electronic messages. The relationships are established and maintained as data by the social networking service.

A file management application (e.g., a file system of a computer operating system, a corporate file system, a collaborative file sharing system such as SHAREPOINT, or a cloud-based file sharing system such as DROPBOX) allows a user, or an entity, search, manipulate, and share files, databases, messages, web pages, or any other objects that use permissions for mediating access that are stored by one or more storage facilities. A storage facility, or an archive, could be a physical entity such as a file system on a hard drive of a computer. An archive could also be a distributed entity such as a "cloud"-based archive. A cloud-based archive can typically be accessed by many users over a network such as the Internet, and allows those used to access stored data from anywhere on the network.

An owner of an artifact, or an authorizing entity, may store the artifact at an archive. When an archive is shared by many users (e.g., an archive in a cloud environment), the archive may be configured to enforce permission control for accessing stored artifacts. In some implementations, the owner may share the access of the artifact with one or more users of the archive. When we say "access," we mean any action made by a user upon an artifact. Access could mean reading data from an artifact, writing data to an artifact, executing an artifact, changing the permissions of an artifact, or other actions or combination of actions. In general, the act of granting access or granting permission to access an artifact is granting permission to perform one or more actions upon the artifact. To control the access of the artifact by other users, the owner may set a permission attribute associated with the artifact stored at the archive. The owner may, for example, set the permission attribute using a file management application. For example, the owner may set the permission attribute such that only a particular user may access the artifact. As another example, the owner may set the permission attribute such that multiple users belonging to a particular user group may access the artifact. As another example, the owner may set the permission attribute as publicly accessible, such that all users of the storage facility may access the artifact. A particular artifact is "private" to a user when the owner of the particular artifact does not set the permission attribute associated with the particular artifact to be accessible to other users.

The archive may be configured to enable users to browse for artifacts. In some implementations, a user may browse for artifacts stored at the archive using a file management application. In some other examples, a user may browse for artifacts using an artifact browse interface configured to work with the various applications described above. Through an application or an artifact browse interface, a user may view and access artifacts that the user has permissions to access. In some implementations, if a user does not have permission to access a particular artifact, the particular artifact is not presented to the user.

The artifacts stored at the archive may be indexed according to one or more characteristics (e.g., name, date, owner, type, etc.), and the archive may be configured to enable users to conduct a search for these artifacts. In some implementations, a user may conduct a search for artifacts using a file management application. In some other examples, a user may conduct the search for artifacts using an artifact search interface configured to work with the various applications described above. Once the relevant artifacts are made available to the user, the user may browse the relevant artifacts.

In some implementations, these kinds of applications are accessed using a web browser interface, a custom application interface (e.g., a dedicated email application or a file system interface of an operating system), a general use mobile application (e.g., email application), a specialized use mobile application (e.g., custom mobile application written for use with a particular system), a search interface, or another kind of interface.

In some examples, an artifact that is otherwise private can be made available to a search engine based on a search permission associated with the artifact. For example, a tag can be added to an artifact to mark the artifact as accessible by other users, or mark multiple artifacts as readable by others users. As another example, artifacts can be tagged in bulk through the use of directory naming conventions, e.g., all artifacts under a "public search" folder can be searched by any user (but not browsable unless the search algorithm has determined that the artifacts are relevant to the search). As another example, when the search finds highly relevant documents that the searching user does not have permission to access, the system may send a message to the artifact owner asking permission to permit the searching owner to access the document.

When we use the term artifact we mean it in a very broad sense, to include, for example, any fragment of data that forms an electronic communication. Each type of communication application allows a user to create, send, receive, view, manage and in other respects to use artifacts. We refer to any of these types of activities and to any other use of artifacts broadly as "interacting" with or "using" artifacts. Any portion of data, such as any portion of an electronic communication, can be an artifact. Anything sent and received by a user of one of the applications can be an artifact. For example, an email message is an artifact. An email message typically has a topic (sometimes denoted by a "subject" field) and contains content written by a user about the topic. An email message can also relate to multiple topics. A portion that is less than all of an email can also be an artifact.

An email message has at least one recipient, and may have many recipients who are either individual users or groups of users (e.g., a mailing list of users). An email message could also contain multiple artifacts. For example, one portion of an email message body could be an artifact, and another portion (e.g., a portion relating to a different topic) could be a different artifact. An attachment to the email message could be yet another artifact, as could an in-line image within the email message.

As another example, a posting on a social networking service, or a portion of a posting, is an artifact. A posting on a social networking service is typically composed by a user and relates to a topic of interest by the user. The posting may be available to all other users linked to the user, or the posting may be available to only select users, or the posting may be available to all users of the social networking service, or the posting may be available to some other category or categories of users.

As another example, a portion of a real-time conversation is an artifact. For example, a real-time communication system, such as an instant messaging system that enables users to exchange short messages in real time, may be used to facilitate and record a series of messages related to a topic or multiple topics being discussed by users of the instant messaging system. The conversation may be held between two or more users; i.e., two or more users may participate in a single conversation, sometimes referred to as a single session. A transcript of messages exchanged in a single session may include one or more artifacts. Each message may be an artifact, or a portion of the conversation (e.g., a portion relevant to a particular topic) or the entire conversation may be an artifact.

Other types of data that can be artifacts include syndication feeds (e.g., RSS feeds), voice data or other kinds of audio (e.g., recorded telephone calls, voice messages such as voicemail, transcripts of a spoken conversation, audio feeds, etc.), and video (recorded video calls, video mail or video messages, security cameras, video feeds, etc.).

The categories of applications described as examples here—email applications, social networking applications, and file management applications, and other electronic communicating facilities, all provide interfaces by which useful artifacts can be created, edited, sent, received, stored, shared, managed, and otherwise used.

Each type of application may or may not be limited in the features associated with its type. Typically, however, their features are not entirely overlapping. For example, a social networking application typically has some features that an email application does not, and vice versa. However, all of the applications that we have described (as well as other types of applications not described here) provide features that enable user interaction with and use of artifacts.

The system and techniques that we describe here can be implemented to allow a user to interact with or use artifacts that are created in different types of applications, including artifacts first created by users in email applications; artifacts first created by users in social networking applications, and artifacts first created by users in file management applications, among other kinds of applications. The system and techniques that we describe here can also be used to author artifacts, and those artifacts may be usable by an existing system such as an email system, social networking system, or file management system.

FIG. 1 is a block diagram of a system that allows users to interact with artifacts first created using electronic communication applications. In the system, a communications facility 100 communicates with data storage and communication systems 112, 122, 132 to send and receive artifacts. Each of the data storage and communication systems 112, 122, 132 could be a server accessible on a network such as the Internet (e.g., by way of a local area network, a mobile telephone network, or another kind of network), or a portion of a server, or a collection of servers. The data storage and communication systems 112, 122, 132 may be accessible using applications (e.g., executable applications that provide user interfaces) running on client computer systems, workstations, mobile devices, etc. that can be used to author, interact with, and use artifacts. The communications facility 100 can then make the artifacts available for users 150, 152 to interact with (we use the term interact broadly to include any kind of use.)

The communications facility receives artifacts, such as email messages 110, social networking communications 120, and data files 130. For example, the email messages 110 can be messages authored natively using protocols of an email system 114 that operates using data storage formats and communication formats compatible with one of the data storage and communication systems 112. A data storage format or communication format is said to be compatible with a data storage and communication system if the data storage and communication system is capable of (e.g., configured to) process data in the format. Some email protocols include SMTP (sometimes referred to by one of several "RFC" [Request For Comments] numbers, including RFC 821, RFC 2821, and RFC 5321), IMAP (some versions include RFC 3501), and POP3 (some versions include RFC 1081, RFC 1225, RFC 1460, RFC 1725, and RFC 1939).

The social networking communications 120 can be portions of data authored natively using protocols of a social networking service 124 that operates using data storage formats and communication formats compatible with another of the data storage and communication systems 122. Some social networking services include FACEBOOK, MYSPACE, TWITTER, LINKEDIN, and IBM SMART-CLOUD.

The references to data files 130 can be portions of data authored natively using protocols of a data management system 134 that operates using data storage formats and communication formats compatible with another of the data storage and communication systems 132. Some data management systems include cloud-based data management systems that provided distributed storage available over a network, for example, systems such as DROPBOX and BOX.NET.

When we refer to an artifact as having been authored, we mean that at least some of the content of the artifact was created by one or more users or devices. Typically this means that a user provided the content as input into a user interface. For example, a user may enter text using an input device or copy existing text from another source and optionally modify it. The user may input or copy other kinds of media such as images, audio, video, or any other kind of data. Sometimes, content is generated by an automated process. For example, a user may configure a device to automatically record data. To name a few examples, the device could be a video camera that automatically captures video, or a telescope that automatically captures astronomical data, a medical device that captures patient data, or geolocation data indicating a physical location of a user or a user device, or a transcription device that automatically captures spoken audio and uses speech recognition to generate text. In these examples, the content is still said to be authored by the user, even though the user did not directly input the content. As another example, an administrator may configure a device to automatically record data, and the recorded data may be said to be authored by the device.

When we refer to an artifact authored natively in a particular system, we mean that the content of the artifact was generated using that system and in a manner and having a form such that the system can use the artifact in its internal processes. In some implementations, an artifact authored natively in a system may have been authored by a user who performed actions in a user interface provided by or compatible with the system. In some implementations, an artifact authored natively in a system may have been generated in a data format usable by the system. In some implementations, the type of content contained in an artifact is determined by the system in which the artifact was authored natively. For example, artifacts authored natively in an email system may be limited to text and attachments, for example, attachments taking the form of data files or in-line data objects embedded in the message body. As another example, artifacts authored natively in a social network system may be limited to text having certain limitations, e.g., a limitation on the number of characters. As another example, artifacts authored natively in a security system may be limited to recording sensor data which includes image data, video data, and audio data.

Besides content authored by a user, each of the artifacts 110, 120, 130 typically contains metadata describing the content. For example, an email message 110 may contain metadata headers that specify the email address of the author, the email addresses of the recipients, a subject line, a source email server, a destination email server (e.g., if the email message has been delivered), timestamps for events such as receipt and delivery of the message, and other kinds of data.

A social networking communication 120 may contain metadata indicating the author of the communication, and also may contain metadata indicating, for example, security settings for the communication (e.g., who may or may not view the communication), and may contain metadata indicating user's reactions to the communication. Some social networking systems allow users to provide snap feedback a communication. In some implementations, a user provides snap feedback about a communication by indicating their support for the communication, and the social networking service can attach a list of supporters to the communication. Other types of snap feedback other than support can also be used. In some implementations, a user can approve of a communication, disapprove of a communication, authorize a communication, delegate or re-send a communication, or provide another indication of the user's position with regard to the communication.

The example shown in FIG. 1 is a general example; the data storage and communication systems 112, 122, 132 could have any of several relationships to the communications facility 100. In some implementations, the communications facility 100 and the data storage and communication systems 112, 122, 132 are all operated by the same entity, for example, the same service provider. In this example, the data storage and communication systems 112, 122, 132 represent systems established by the service provider to provide users with different techniques for providing artifacts 110, 120, 130 to the communications facility 100.

Figure 2:
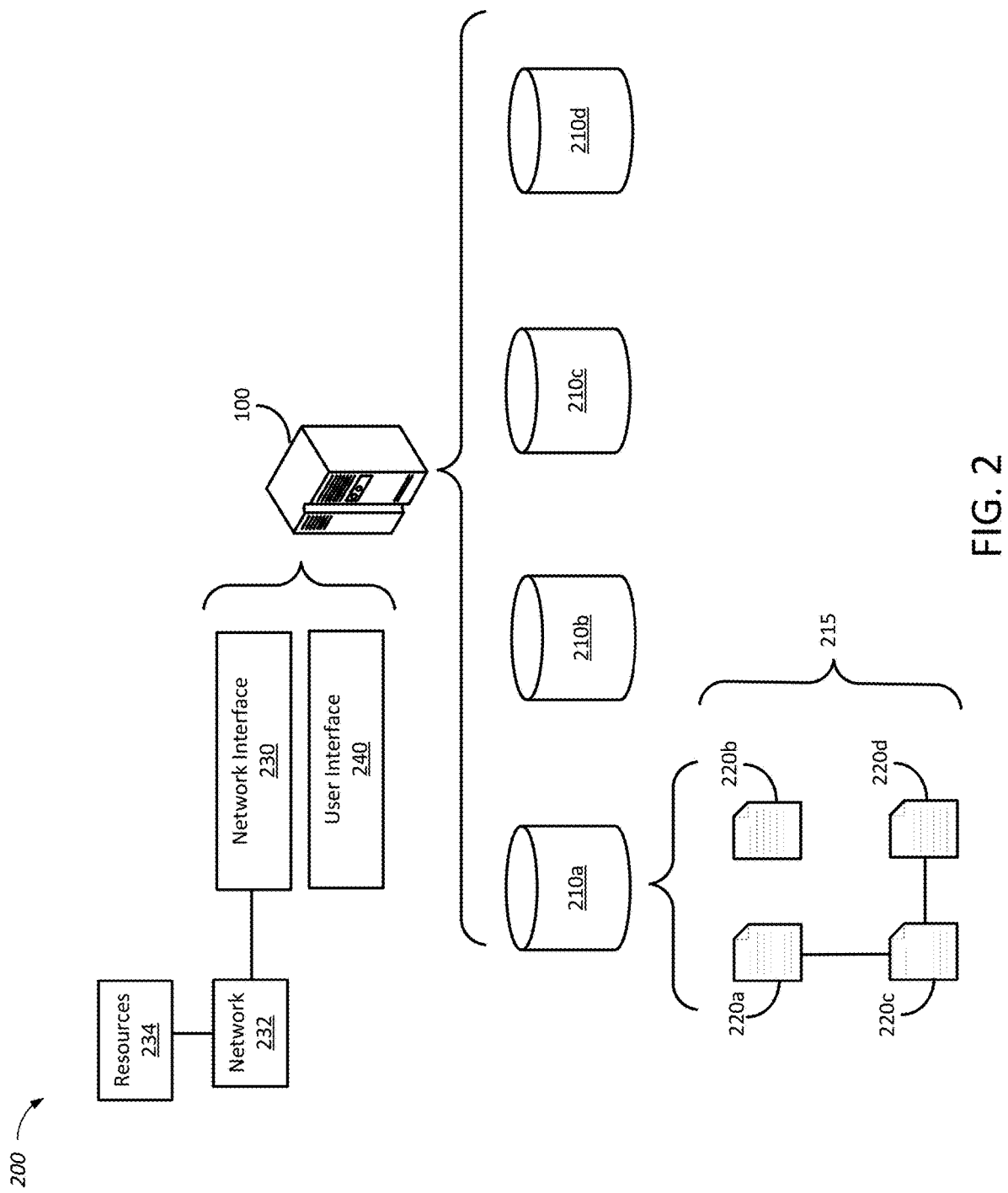
FIG. 2 is a block diagram of an example storage technique used by a communications facility.

FIG. 2 shows a block diagram of an example storage technique used by the communications facility 100. In this example, the communications facility 100 assigns artifacts to one or more data archives 210a-d. Data archives 210a-d are defined as logically separated collections of data. A data archive 210a-d need not be defined by physical constructs such as data storage devices. A data archive 210a-d enables multiple users to interact with artifacts using a variety of interfaces (e.g., the interfaces 140, 142 shown in FIG. 1) that each provides similar features. The features can include collaborative features, for example, features that allow multiple users to interact with the same artifact. When two or more users interact with the same artifact, the artifact can be said to be shared between the two users.

In some implementations, an artifact is assigned to or contained in a data archive by storing data that references to or represents the artifact in the data archive 210a-d. For example, a data archive 210a-d may store a reference usable to access content of an artifact. The data archive 210a-d itself need not store the actual content of artifacts assigned to it, although in some implementations it can store content of artifacts.

In some implementations, each data archive 210a-d stores artifacts related to a common source. For example, a data archive 210a may contain artifacts 220a-d each having been identified as relevant to an attribute associated with the data archive 210a. In some implementations, some or all of the artifacts 220a-d are identified to be relevant to an attribute associated with the data archive 210a based on an explicit identifier in the artifacts. For example, the artifacts 220a-d may contain a metadata field indicating a domain of the sender that is associated with the data archive 210a. In some implementations, some or all of the artifacts 220a-d are identified to be relevant to an attribute associated with the data archive 210a based on an analysis of the content of the artifacts. For example, the communications facility 100 can identify particular portions of text contained in the artifacts 220a-d and make inferences about the relevance of the artifacts 220a-d based on the identified text.

In some implementations, a data archive 210a-d could be a database table, or a collection of database tables, or a portion of a database table, or another kind of data storage mechanism. In some implementations, a data archive 210a-d could be a file system used by a computer operating system. In some implementations, a data archive 210a-d may be stored on a server or collection or servers (e.g., a cloud-based archive) as a combination of database tables containing metadata about artifacts, including references to the artifacts stored on the server or collection or servers, or stored by another facility such as a data archive, or references to media of other types, e.g., references to printed copies of the artifacts in a storage facility. Artifacts could be stored among many different systems and different types of systems.

In some implementations, a data archive 210a-d could be created by a user of the communications facility 100. In some implementations, a data archive 210a-d could be created by the communications facility 100, for example, automatically generated. One or more users can then add artifacts 220a-d to the data archive 210a-d.

In some implementations, an artifact may be contained in multiple data archives 210a-d. For example, an artifact 220a may relate to multiple topics, and so the artifact 220a can be stored or pointed to by data archives 210a-d each associated with one of the topics.

The communications facility 100 could be configured to identify topics of artifacts 220a-d in any of several kinds of contexts. The communications facility 100 can also automatically populate data archives 210a-d with artifacts 220a-d based on topics identified as relevant to the artifacts 220a-d. The data archives 210a-d can be updated to include new artifacts as new artifacts are generated or discovered, a process sometimes called dynamic population. The communications facility 100 can also automatically create a data archive 210a-d based on an identification of a common topic among artifacts. One or more sources of data (e.g., an email archive) can be used to automatically create and populate a data archive 210a-d.

Artifacts can be arranged in a data archive 210a in the form of a hierarchy 215. For example, one artifact 220c may be below another artifact 220a in the hierarchy. In turn, another artifact 220d may be below that artifact 220c in the hierarchy. In some implementations, artifacts may be arranged in the hierarchy based on the date and time at which an artifact was created, or based on a priority assigned to the artifact, or based on a security level assigned to the artifact, or based on other information. In some other implementations, a hierarchy may be defined by a directory structure of the communications facility 100 or the data archive 210a, where artifacts in a particular directory belong to the same level in the hierarchy.

In some implementations, an authorizing entity using the communications facility 100 may define permission attributes for artifacts in a hierarchy, where the permission attributes determine which other entities may access which artifacts associated with the communications facility 100. For example, the hierarchy 215 includes three levels of artifacts 220a, 220c, and 220d to which other entities may access. In some implementations, one or more entities, or one or more groups of entities that use the communications facility 100 may be permitted to access artifacts belonging to a particular level of the hierarchy as defined by the authorizing entity.

In the hierarchy 215, an entity permitted to access a particular level is authorized to access artifacts associated with the same level as well as artifacts associated with levels below. For example, a first entity that is permitted to access the first and highest level of the hierarchy 215 is authorized to access the artifact 220a as well as the artifacts 220c and 220d that are associated with the second and third levels, respectively. As another example, a second entity that is permitted to access the second level of the hierarchy 215 is authorized to access the artifact 220c associated with the second level as well as the artifact 220d associated with the third level. However, the second entity is not authorized to access the artifact 220a associated with the first (i.e., higher) level. A third entity that is permitted to access the third level of the hierarchy 215 is authorized to access the artifact 220d associated with the third level and not artifact 220a or 220c. In some implementations, the second entity and the third entity may gain access to the other artifacts associated with a higher level (e.g., artifact 220a) through an authorization process with the authorizing entity, such as the interaction shown in FIG. 3C.

Permissions may be set up in other ways. In some implementations, permissions may be assigned according to ranks or roles within an organization rather than just according to a hierarchy. For example, each member of a sales staff may be authorized to access artifacts created by other members of the sales staff, but may not access artifacts created by members of the management staff. In some implementations, permissions may be assigned to an entity based on factors other than the entity's position in a hierarchy. For example, an entity associated with a low hierarchical level (e.g., a security guard in a corporate building) may be given access to some or all artifacts normally only accessible to entities higher in the hierarchy based on a special status (e.g., the security guard being on duty) of the entity. In some implementations, permissions may be assigned according to activities assigned to an entity. For example, a member of an organization who works on a particular project or handles a particular customer may be authorized to access the artifacts relating to that particular project or that particular customer regardless of hierarchy levels. Other types of authorization are possible.

The communications facility 100 has a network interface module 230 that allows the communications facility 100 to interact with other resources 234 available on a network 232 (e.g., a local area network, a wide area network, the Internet, or another kind of network). The resources may be other communications systems such as email systems, social networking services, and data storage systems. The network interface module 230 may be a combination of software and hardware. In some implementations, the network interface module 230 includes an application program interface (API) that enables the communications facility 100 to access systems such as the systems 114, 124, 134 shown in FIG. 1.

The communications facility 100 also has a user interface 240 that enables users of the communications facility 100 to interact with the artifacts 220*a-d* assigned to the data archives 210*a-d*. For example, the user interface 240 may enable users to use one of the interfaces 140, 142 shown in FIG. 1. The user interface 240 may be a combination of hardware and software.

Figure 3A:
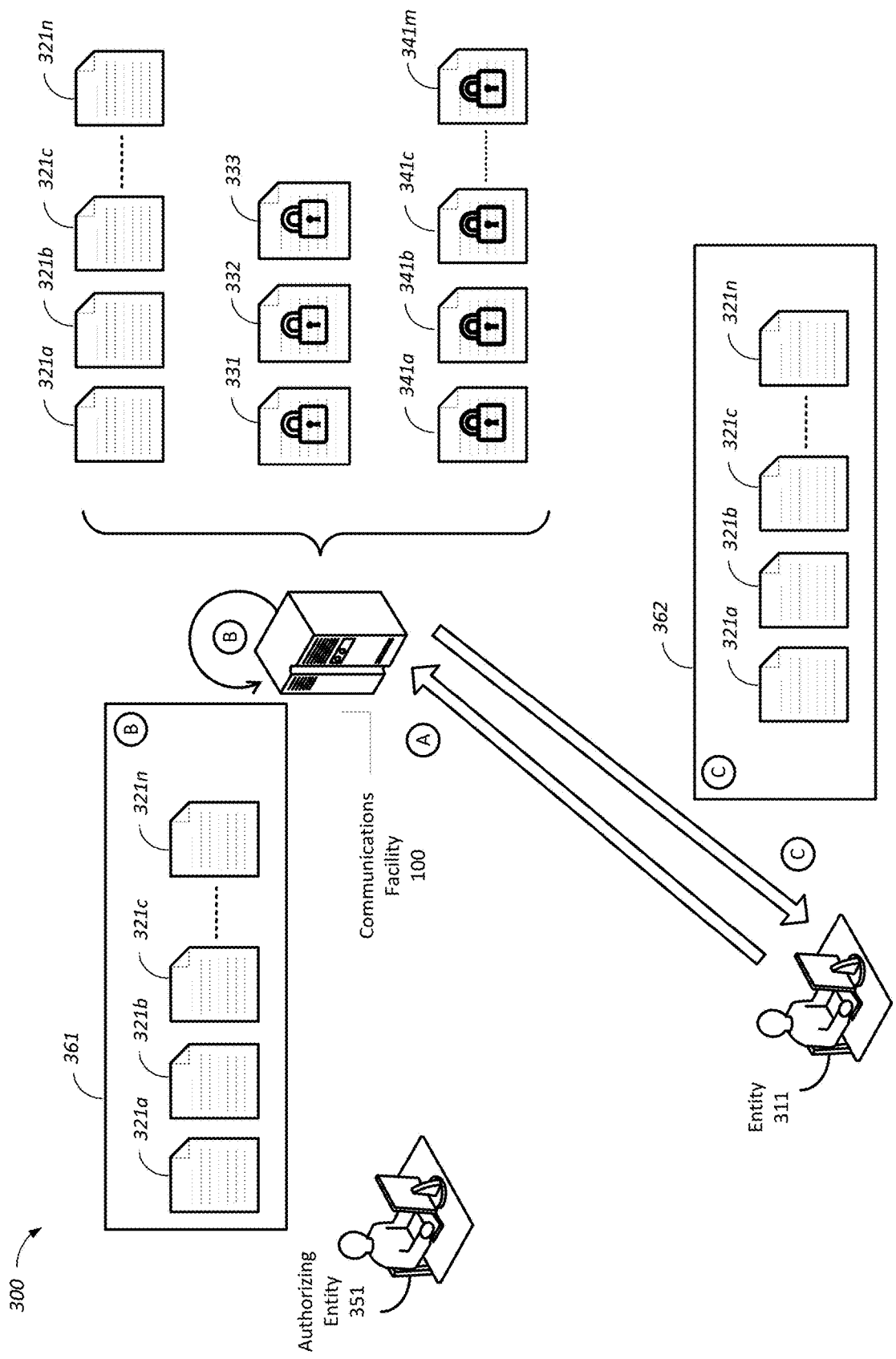
FIGS. 3A-3C are block diagrams of an example system that provides artifacts stored at a communications facility to an entity.

FIG. 3A shows a block diagram of an example system 300 that provides artifacts stored at a communications facility 100 to an entity 311 (e.g., a user) browsing for artifacts. In some examples, when the entity 311 browses for artifacts, the communications facility 100 communicates, to the entity 311, information about any artifacts that the entity 311 has access to (e.g., artifacts owned by the entity 311, artifacts identified by their permission attributes as accessible to the entity 311, or artifacts identified by their permission attributes as publicly accessible.) The system 300 includes interactions between the communications facility 100, an entity 311, and an authorizing entity 351. Multiple artifacts are stored at one or more archives of the communications facility 100, including public artifacts 321*a-n*, and private artifacts 331, 332, 333, and 341*a-m*. The archives may be one or more of data archives 210*a-d* as described in FIG. 2.

FIG. 3A also illustrates an example flow of data, shown in stages (A) to (C). Stages (A) to (C) may occur in the illustrated sequence, or they may occur in a sequence that is different than in the illustrated sequence. In some implementations, one or more of the stages (A) to (C) may occur offline, where the communications facility 100 may perform computations when some entities are not connected to the communications facility 100.

During stage (A), the entity 311 browses for artifacts stored, or archived, at the communications facility 100. In some implementations, the browsing may be performed using a user interface (e.g., user interface 240).

During stage (B), the communications facility 100 receives a list of artifacts stored in an archive, and identifies, among the list of artifacts, a set of artifacts each having a permission attribute indicating that the respective artifact is accessible to the entity 311. Here, in response to the browsing initiated by the entity 311, the communications facility 100 identifies that public artifacts 321*a-n* are accessible by the entity 311, whereas private artifacts 331, 332, 333, and 341*a-m* are not accessible by the entity 311.

In general, a public artifact is an artifact having a permission attribute that indicates the artifact may be accessed by any entity, e.g., any entity using the communications facility 100. In some implementations, the permission attribute may be "read, write, execute" permissions (e.g., permissions for a user or category of users to read data associated with the artifact, write associated with an individual artifact stored at a file system. In some implementations, the permission attribute may be represented by a permission value where an artifact is not accessible if the permission value is below a threshold value. For example, a threshold value to read an artifact may be "N," where N is an integer number, and an entity would not be able to read the artifact if the entity's permission attribute associated with the artifact is below N. In some implementations, the permission attribute may be associated with a directory, where all artifacts stored in a particular directory are assigned with the permission attribute associated with the particular directory. For example, all artifacts stored in a "public directory" may be designated as public artifacts, which are accessible by any entity using the communications facility 100. In some implementations, the permission attribute may be associated with a particular archive, where all artifacts stored in the archive are assigned with the permission attribute associated with the particular archive. For example, artifacts associated with a particular topic may be stored at a specific data archive (e.g., 210*a-d*) that is configured to be public accessible. Here, public artifacts 321*a-n* are accessible by any entity using the communications facility 100, including the entity 311. In some examples, a public artifact may be accessed in some ways but not others, depending on its permissions. For example, a public artifact may be readable by all users but not writeable by all users.

In general, a private artifact is an artifact that has a permission attribute indicating the artifact is accessible only by entities that satisfy the permission attribute of the artifact. In some implementations, an artifact may be configured as a private artifact by the authorizing entity that defines the permission attribute of the artifact. In some implementations, all artifacts stored in a particular directory may be configured as private artifacts by modifying the permission attribute associated with the particular directory. In some implementations, all artifacts stored in a particular archive may be configured as private artifacts by modifying the permission attribute associated with the particular archive. In some implementations, the permission attribute associated with a particular level of a hierarchy may be defined, such that all artifacts associated with the particular level and any levels below are configured as private artifacts. Some of the private artifacts 331, 332, 333 shown in FIG. 3A are configured as private artifacts by the authorizing entity 351, and the other private artifacts 341*a-m* are configured as private artifacts by other authorizing entities not shown in this figure.

During stage (C), the set 362 of public artifacts 321*a-n* are provided to the entity 311 for browsing. Using the user interface, the entity 311 then may, for example, read, edit, overwrite, delete, copy, or process the content of the public artifacts 321*a-n* to the extent permitted by the permission attributes associated with each of the public artifacts 321*a-n*. When we say "processing the content of an artifact," we mean taking one or more actions permitted by the permission attributes on the content of the artifact.

Figure 3B:
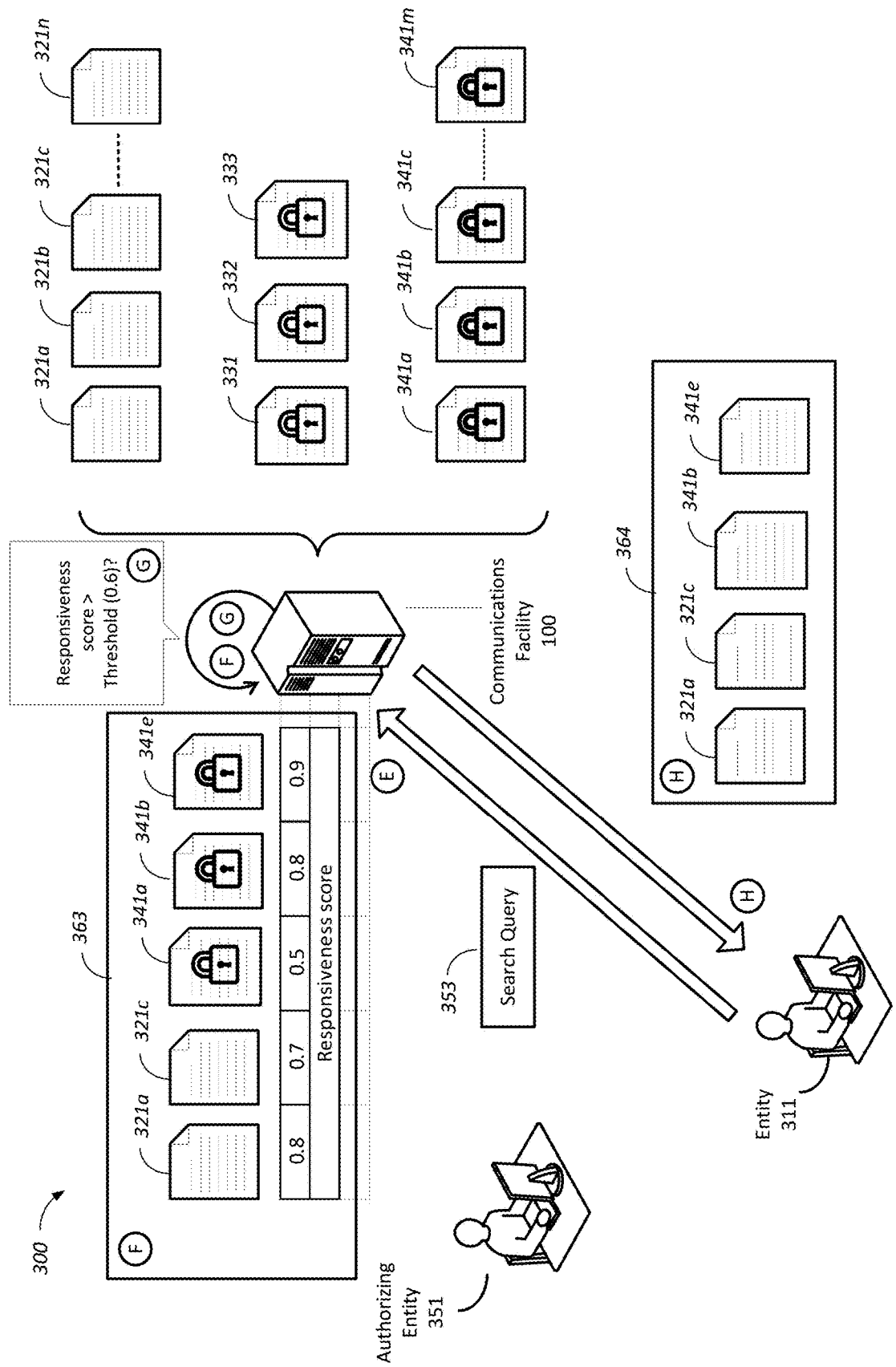

FIG. 3B shows a block diagram of an example system 300 that provides artifacts stored at a communications facility 100 to an entity 311 searching for artifacts. In general, the communications facility 100 may provide a set of artifacts to the entity 311, such that the set of artifacts include artifacts that the entity 311 has access to, as well as artifacts that satisfy a threshold responsiveness value, according to the search query issued by the entity 311. For example, the communications facility 100 may include search engine functionality. In some examples, the communications facility 100 includes a search engine (e.g., as a component or module or the communications facility 100). In some examples, the communications facility 100 communicates with a search engine, e.g., a search engine accessible to the communications facility 100 on a network. The threshold responsiveness value may be defined by the authorizing entities of artifacts, the administrator of the communications facility 100, the search algorithm being used, or any combination thereof.

FIG. 3B also illustrates an example flow of data, shown in stages (E) to (H). Stages (E) to (H) may occur in the illustrated sequence, or they may occur in a sequence that is different than in the illustrated sequence. In some implementations, one or more of the stages (E) to (H) may occur offline, where the communications facility 100 may perform computations when some entities are not connected to the communications facility 100.

During stage (E), the entity 311 searches for artifacts stored at the communications facility 100. In some implementations, the search may be performed using a user interface (e.g., user interface 240). Here, the entity 311 submits a search query 353 to the communications facility 100 using the user interface to search for artifacts that satisfy the search query.

During stage (F), the communications facility 100 receives the search query 353, and conducts a search using a search algorithm. In some implementations, the communications facility 100 may conduct the search on public artifacts and private artifacts. Here, the communications facility 100 conducts the search based on the search query 353, and receives a list 363 of artifacts 321*a*, 321*c*, 341*a*, 341*b*, and 341*e* that are responsive to the search query 353 issued by the entity 311. In some implementations, the search query 353 is provided to a search engine that executes a search of artifacts based on the search query 353. For example, the search engine (which may be a component or module of the communications facility 100) may identify the artifacts that are responsive to the search query 353 issued by the entity 311.

In some implementations, each artifact may be assigned a responsiveness score that is determined (e.g., based on a search algorithm, such as a search algorithm used by a search engine) based on the relevance of each artifact to the search query 353. For example, a responsiveness score may be assigned to an artifact based in part on a number of keywords in the artifact that match the query terms. As another example, a responsiveness score may be assigned to an artifact based in part on a popularity of the artifact. As another example, a responsiveness score may be assigned to an artifact based in part on a creation date of the artifact. As another example, a responsiveness score may be assigned to an artifact based in part on a data type (e.g., email, picture, etc.) of the artifact. Here, the responsiveness scores for the artifacts 321*a*, 321*c*, 341*a*, 341*b*, and 341*e* are 0.8, 0.7, 0.5, 0.8, and 0.9, respectively. A higher responsiveness score indicates that the respective artifact is more responsive to the search query than artifacts with a lower responsiveness score.

During stage (G), the communications facility 100 identifies, among the list of artifacts, a set of artifacts each having a permission attribute indicating that the respective artifact is accessible to the entity 311 when the respective artifact is responsive, above a threshold responsiveness value, to the search query 353 issued by the entity 311.

In some implementations, the communications facility 100 may enable authorizing entities to define one or more new properties associated with a permission attribute. For example, to enhance information sharing in permission-protected archives, a "search permission" may be defined to identify private artifacts that are only accessible by another entity if a search algorithm has determined that these private artifacts to be highly relevant to a search performed by the entity.

In some implementations, an archive may store a portion of data associated with a permission attribute, the permission attribute indicating one or more of several permission states, the permission states including a) making the portion of data available to an entity when the entity is browsing a file system, and b) making the portion of data available to an entity when the entity performs a search query to which the portion of data is responsive. For example, the communications facility 100 may assign a relevance score to some or all of the artifacts stored in the archive based on the search (e.g., based on a search algorithm applied to the artifacts). A more relevant artifact (e.g., more responsive to the search than other artifacts) may receive a higher relevance score than a less relevant artifact. In some implementations, the relevance score of an artifact may be used as the permission attribute associated with the artifact. In some implementations, the relevance score of an artifact may be combined with the permission value of the permission attribute associated with the artifact to generate a new permission value associated with the artifact.

In some implementations, a tag can be added to an artifact to mark an artifact, or multiple artifacts, as searchable by other entities. For example, a tag may be added to the metadata of an artifact (e.g., a header field of an email, or an inode of a file in a directory on a storage system) to indicate that the permission attribute of the artifact includes a search permission. In some implementations, artifacts can be tagged in bulk through the use of directory naming conventions. For example, all artifacts under a "public search" folder can be searched by any entity, but not browsable unless the search algorithm has determined that the artifacts are relevant to the search.

In some implementations, the communications facility 100 may receive, from an owner of a particular artifact, a request to modify a permission attribute of the particular artifact. For example, a user may indicate in a user interface that an artifact can be accessed by other users performing a search, and, in some examples, the user may also indicate a threshold relevance above which the artifact can be accessed if the artifact is responsive to a search. The communications facility 100 may then modify the permission attribute of the particular artifact, where the modified permission attribute indicates that the particular artifact is accessible to the entity when the particular artifact is responsive, above the threshold responsiveness value, to the search query issued by the entity.

In some implementations, the communications facility 100 may receive, from an owner of multiple artifacts sharing a common attribute, a request to modify a permission attribute of the multiple artifacts. The communications facility 100 may then modify the permission attribute of the multiple artifacts, where the modified permission attribute indicates that one or more artifacts of the multiple artifacts are accessible to the entity when the one or more artifacts are responsive, above the threshold responsiveness value, to the search query issued by the entity. For example, the common attribute may include an artifact folder (e.g., a folder containing the artifacts) searchable by the entity.

The communications facility 100 may identify, among the list of artifacts, an initial set of artifacts each having a permission attribute indicating that the respective artifact is not accessible to the entity. Here, the communications facility 100 identifies that private artifacts 341*a*, 341*b*, and 341*e* are not accessible to the searching entity 311.

The communications facility 100 may then determine that one or more artifacts of the initial set of artifacts are responsive, above the threshold responsiveness value, to the search query. In some implementations, the threshold responsiveness value is a numerical value defined by the communications facility 100. In some implementations, the threshold responsiveness value is defined by the authorizing entities of the private artifacts. In some implementations, the threshold responsiveness value is defined by the search algorithm. For example, the threshold responsiveness value for a particular artifact may be defined by the ranking of the artifact in the search results generated by the search algorithm. In some implementations, the threshold responsiveness value is defined based on a permission value associated with the permission attribute. Here, the threshold responsiveness value is defined as 0.6. In this way, any artifact having a responsiveness value of 0.6 with respect to a particular search (e.g. a search of artifacts performed by a search engine in response to a search query) can be made known or accessible to a searching entity.

The threshold value need not be an integer value, but could be another value such as a rating or grading system. For example, a search system may rate search results according to a number of stars, from one to five stars (or different colors of stars, such as red, yellow, and green), each representing a degree of responsiveness. In this example, the threshold value could be a minimum number of stars (or one or more colors of stars, such as yellow and green).

In some implementations, the communications facility 100 may determine whether a particular artifact of the list of artifacts meets or exceeds the threshold responsiveness value, the determination based on a responsiveness score determined by a search engine to which the search query was provided. Here, the communications facility 100 determines that private artifacts 341*b* and 341*e* have responsiveness scores that are higher than the threshold responsiveness value of 0.6.

In response to determining that the one or more artifacts are responsive, above the threshold responsiveness value, to the search query, the communications facility 100 may identify the one or more artifacts as the set of artifacts each having a permission attribute indicating that the respective artifact is accessible to the entity. Here, the communications facility 100 identifies that private artifacts 341*b* and 341*e* have a responsiveness scores that are higher than the threshold responsiveness value of 0.6, and therefore the communications facility 100 may make artifacts 341*b* and 341*e* as accessible to the searching entity 311.

During stage (H), a set 364 of artifacts 321*a*, 321*c*, 341*b*, and 341*e* are provided to the searching entity 311. In some implementations, pointers (e.g., references, such as data indicating a storage address of other data) to the artifacts 321*a*, 321*c*, 341*b*, and 341*e* may be provided to the searching entity 311. Using the user interface, the searching entity 311 then may read, edit, overwrite, delete, copy, or process the content of the relevant artifacts to the extent permitted by the permission attributes associated with these artifacts.

Figure 3C:
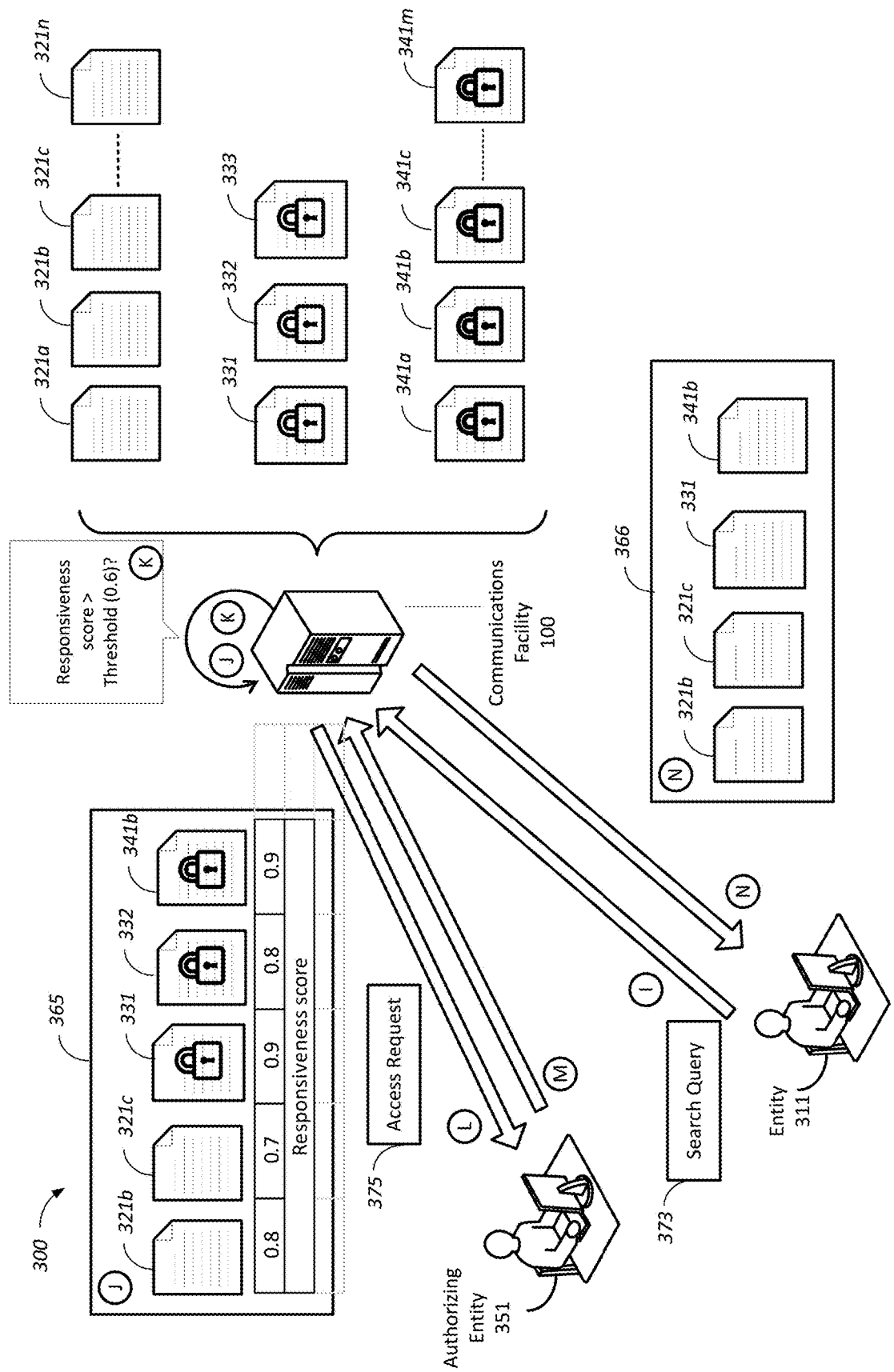

FIG. 3C shows a block diagram of an example system 300 that requests permission to provide artifacts stored at a communications facility 100 to a user entity 311 searching for artifacts. In general, when the communications facility 100 identifies highly relevant artifacts (e.g., relevant above a threshold) that the searching entity 311 does not have permission to access, the communications facility 100 may send a message to the authorizing entity 351 of a highly relevant private artifact asking permission to permit the searching entity 311 to access the private artifact.

FIG. 3C also illustrates an example flow of data, shown in stages (I) to (N). Stages (I) to (N) may occur in the illustrated sequence, or they may occur in a sequence that is different than in the illustrated sequence. In some implementations, one or more of the stages (I) to (N) may occur offline, where the communications facility 100 may perform computations when some entities are not connected to the communications facility 100.

During stage (I), the entity 311 searches for artifacts stored at the communications facility 100. In some implementations, the search may be performed using a user interface (e.g., the user interface 240 shown in FIG. 2). Here, the entity 311 submits a search query 373 to the communications facility 100 using the user interface to search for artifacts that satisfy the search query.

During stage (J), the communications facility 100 receives the search query 373, and conducts a search using a trusted search algorithm. Here, the communications facility 100 conducts the search based on the search query 373, and receives a list 365 of artifacts 321*b*, 321*c*, 331, 332, and 341*b* that have been responsive to the search query 373 issued by the entity 311. The communications facility 100 may determine that the authorizing entity 351 has defined the permission attribute of the private artifact 331 and 332 in a way that the communications facility 100 is required to send an access request to the authorizing entity 351 before granting access to another entity.

During stage (K), the communications facility 100 identifies a set of artifacts responsive, above a threshold responsiveness value, to the search query 373 issued by the entity 311 before sending the access request 375 to the authorizing entity 351. Here, the communications facility 100 determines that artifacts 321*b*, 321*c*, 331, 332, and 341*b* all have a responsiveness score that are higher than the threshold responsiveness value of 0.6.

During stage (L), the communications facility 100 may make a request to a second entity to give permission to the entity to access a particular artifact of the set of artifacts, the second entity identified as an owner of the particular artifact. Here, the communications facility 100 sends an access request 375 to the authorizing entity 351 identifying the private artifacts 331 and 332, and requesting that the authorizing entity 351 grant access to the private artifacts 331 and 332. In some implementations, the access request 375 may identify the searching entity 311 that the communications facility 100 will be granting access to, so that the authorizing entity 351 can decide whether or not it is appropriate for the searching entity 311 to have access to private artifacts 331 and 332. In some implementations, the access request 375 may be an email sent to the authorizing entity 351, or a SMS message sent to the authorizing entity 351, or another type of communication.

During stage (M), if the authorizing entity 351 decides to grant access, he can respond to the access request 375 by sending to the communications facility 100 an access permission authorization granting access to the private artifact. For example, the access permission authorization may be the form of an email, may take the form of a response option in a web page linked to by the access request 375, or may take another form. Here, the authorizing entity 351 decides to grant access of the private artifact 331, but decides to deny access of the private artifact 332 to the searching entity 311.

In some implementations, the communications facility 100 receives a response from the authorizing entity granting the permission to the searching entity to access the particular artifact, and makes the particular artifact available to the entity. Here, the authorizing entity 351 grants access of the private artifact 331 to the searching entity 311, and the communications facility 100 makes the private artifact 331 available to the searching entity 311.

In some implementations, the communications facility 100 receives a response from the authorizing entity denying the permission to the searching entity to access the particular artifact; and removes the particular artifact from the set of artifacts. Here, the authorizing entity 351 denies access of the private artifact 332 to the searching entity 311, and the communications facility 100 removes the private artifact 332 from the set 365 of artifacts.

During stage (N), a set 366 of artifacts 321b, 321c, 331, and 341b are provided to the searching entity 311. Using the user interface, the entity 311 then may read, edit, overwrite, delete, copy, or process the content of the relevant artifacts to the extent permitted by the permission attributes associated with these artifacts.

Figure 3D:
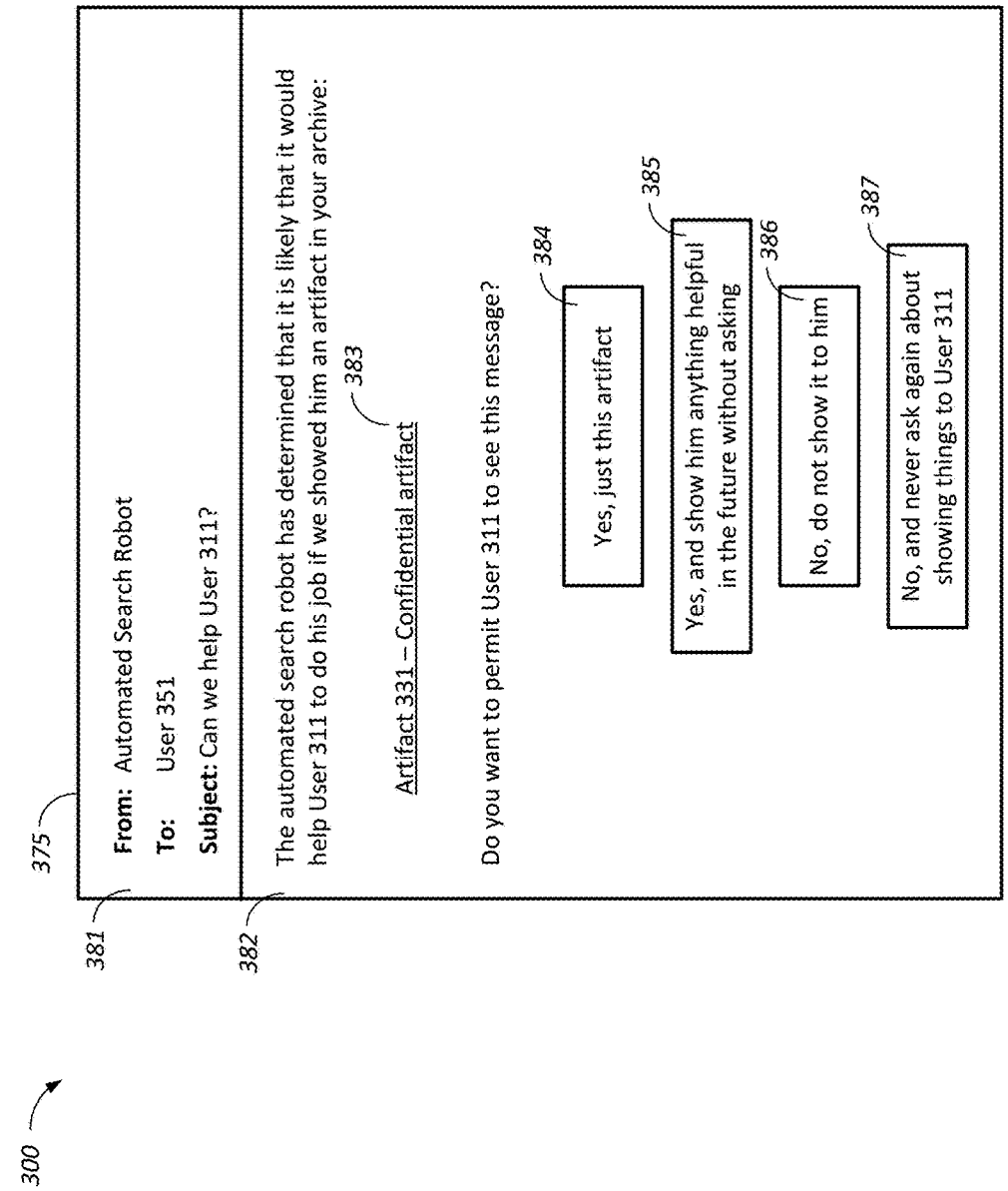
FIG. 3D illustrates an example access request.

FIG. 3D illustrates an example access request 375. The access request 375 may include a header portion 381 and a body portion 382. In some implementations, the header portion 381 may include the "From" header indicating the identity of the sending entity of the access request 375, the "To" header indicating the identity of the recipient of the access request 375, the "Subject" header indicating the topic of the access request 375. Here, the access request 375 is sent from the Automated Search Robot, which may be the communications facility 100. The access request 375 is sent to the authorizing entity 351, and the subject indicates "Can we help User 311?"

In some implementations, the body portion 382 of the access request 375 may include a brief description of the request, a link 383 for the authorizing entity 351 to review the private artifact 331, and click-buttons 384, 385, 386, and 387 for responding to the access request 375. In some implementations, a response may be generated after the authorizing entity 351 clicks on one of the click-buttons 384, 385, 386, 387. Here, four response options are presented to the authorizing entity 351.

If the authorizing entity 351 clicks on the click-button 384, a response is sent to the communications facility 100 indicating that the authorizing entity 351 has granted the entity 311 access to the private artifact 331. In response, the communications facility 100 makes the private artifact 331 available to the entity 311.

If the authorizing entity 351 clicks on the click-button 385, a response is sent to the communications facility 100 indicating that the authorizing entity 351 has granted the entity 311 access to any private artifacts of the authorizing entity 351 that are responsive, above the threshold responsiveness value, to search queries issued by the entity 311. In response, the communications facility 100 makes the private artifact 331 available to the entity 311, and if the entity 311 issues subsequent queries that result in private artifacts of the authorizing entity 351 that are responsive, above the threshold responsiveness value, the communications facility 100 could make those private artifacts available to the entity 311 without sending another access request to the authorizing entity 351.

If the authorizing entity 351 clicks on the click-button 386, a response is sent to the communications facility 100 indicating that the authorizing entity 351 has denied the entity 311 access to the private artifact 331. In response, the communications facility 100 may remove the private artifact 331 from the set of artifacts accessible to the entity 311.

If the authorizing entity 351 clicks on the click-button 387, a response is sent to the communications facility 100 indicating that the authorizing entity 351 has denied the entity 311 access to all private artifacts of the authorizing entity 351, and the communications facility 100 may not send another access request to the authorizing entity 351 when the entity 311 issues subsequent search queries. In response, the communications facility 100 may remove the private artifact 331 from the set of artifacts accessible to the entity 311, and the communications facility 100 would not make any private artifacts of the authorizing entity 351 available to the entity 311 in subsequent search queries issued by the entity 311, even if those private artifacts are responsive above the threshold responsiveness value.

In some implementations, the access request 375 may include other types of buttons. For example, the access request 375 could include a "delegate" button that enables the authorizing entity 351 to delegate the decision to another entity. As another example, the access request 375 could include a "second opinion" button that enables the authorizing entity 351 to obtain input about the decision from another entity. Other options are also possible.

Figure 4:
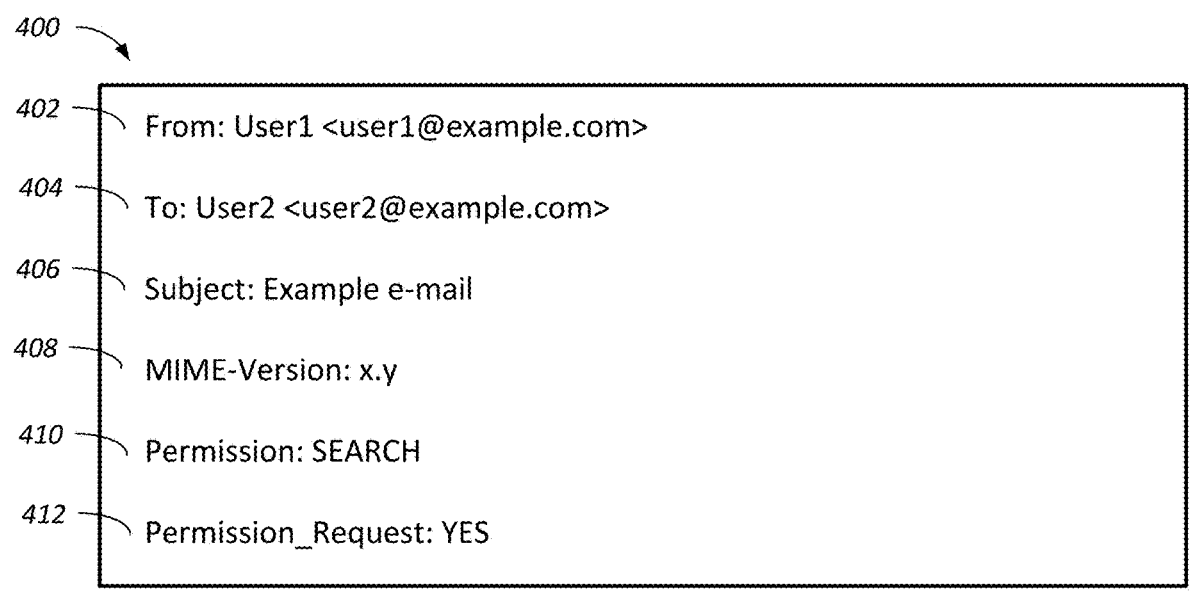
FIG. 4 illustrates example headers in an electronic message.

FIG. 4 illustrates example headers in an electronic message 400. The headers in the electronic message 400 may be generated by an authorizing entity, by an application used by the authorizing entity, or by the communications facility 100. Some example headers include the "From" header 402 indicating the identity of the sending entity of the electronic message 400, the "To" header 404 indicating the identity of the recipient of the electronic message 400, the "Subject" header 406 indicating the topic of the electronic message 400, and the "MIME-Version" header 408 indicating the MIME version used by the system generating the electronic message 400. The "Permission" header 410 may indicate that the electronic message 400 is only accessible by another entity if a search algorithm used by the communications facility 100 has determined that the electronic message 400 to be highly relevant to a search performed by the entity. The "Permission_Request" header 412 may indicate that the communications facility 100 is required to send the authorizing entity an access request before granting permission to another entity to access the electronic message 400.

Figure 5A:
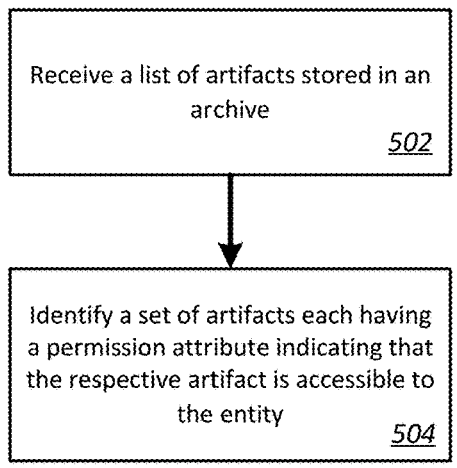
FIG. 5A is a flow chart illustrating an example process that identifies artifacts accessible to an entity in response to a search query issued by the entity.

FIG. 5A is a flow chart illustrating an example process 500 for identifying artifacts accessible to an entity in response to a search query issued by the entity. In general, the process 500 receives a search query from an entity for artifacts that satisfy the search query, and provides a set of artifacts that satisfy the search query and the permission attributes. The process 500 can be performed by a computer system comprising one or more computers, for example, the communications facility 100 as shown in FIG. 1.

The system receives a list of artifacts stored in an archive, the artifacts being responsive to a search query issued by an entity (502). In some implementations, the system may conduct the search on public artifacts and private artifacts. In some implementations, each artifact may be assigned a responsiveness score based on the relevance of each artifact to the search query.

The system identifies, among the list of artifacts, a set of artifacts each having a permission attribute indicating that the respective artifact is accessible to the entity when the respective artifact is responsive, above a threshold responsiveness value, to the search query issued by the entity (504). In some implementations, the system may enable authorizing entities to define one or more new properties associated with a permission attribute. For example, a search permission may be defined to identify private artifacts that are only accessible by another entity if a search algorithm has determined that these private artifacts to be highly relevant to a search performed by the entity.

In some implementations, an archive may store a portion of data associated with a permission attribute, such that the permission attribute indicates one or more of several permission states. The permission states can include a) making the portion of data available to an entity when the entity is browsing a file system, and b) making the portion of data available to an entity when the entity performs a search query to which the portion of data is responsive. For example, the system may assign a relevance score to each artifact stored in the archive based on the search. In some implementations, the relevance score of an artifact may be used as the permission attribute associated with the artifact. In some implementations, the relevance score of an artifact may be combined with the permission value of the permission attribute associated with the artifact to generate a new permission value associated with the artifact. In some implementations, a tag can be added to an artifact to mark an artifact, or multiple artifacts, as searchable by other entities. In some implementations, artifacts can be tagged in bulk through the use of directory naming conventions.

In some implementations, the system may identify, among the list of artifacts, an initial set of artifacts each having a permission attribute indicating that the respective artifact is not accessible to the entity. The system may further determine that one or more artifacts of the initial set of artifacts are responsive, above the threshold responsiveness value, to the search query. In response to determining that the one or more artifacts are responsive above the threshold responsiveness value to the search query, the system may identify the one or more artifacts as the set of artifacts each having a permission attribute indicating that the respective artifact is accessible to the entity. In some implementations, the artifact may be an electronic message and the permission attribute may be a header field of the electronic message.

In some implementations, the system may determine whether a particular artifact of the list of artifacts meets or exceeds the threshold responsiveness value. The determination is based on a responsiveness score determined by a search engine to which the search query was provided. In some implementations, the system may determine the threshold responsiveness value based on a permission value associated with the permission attribute.

Figure 5B:
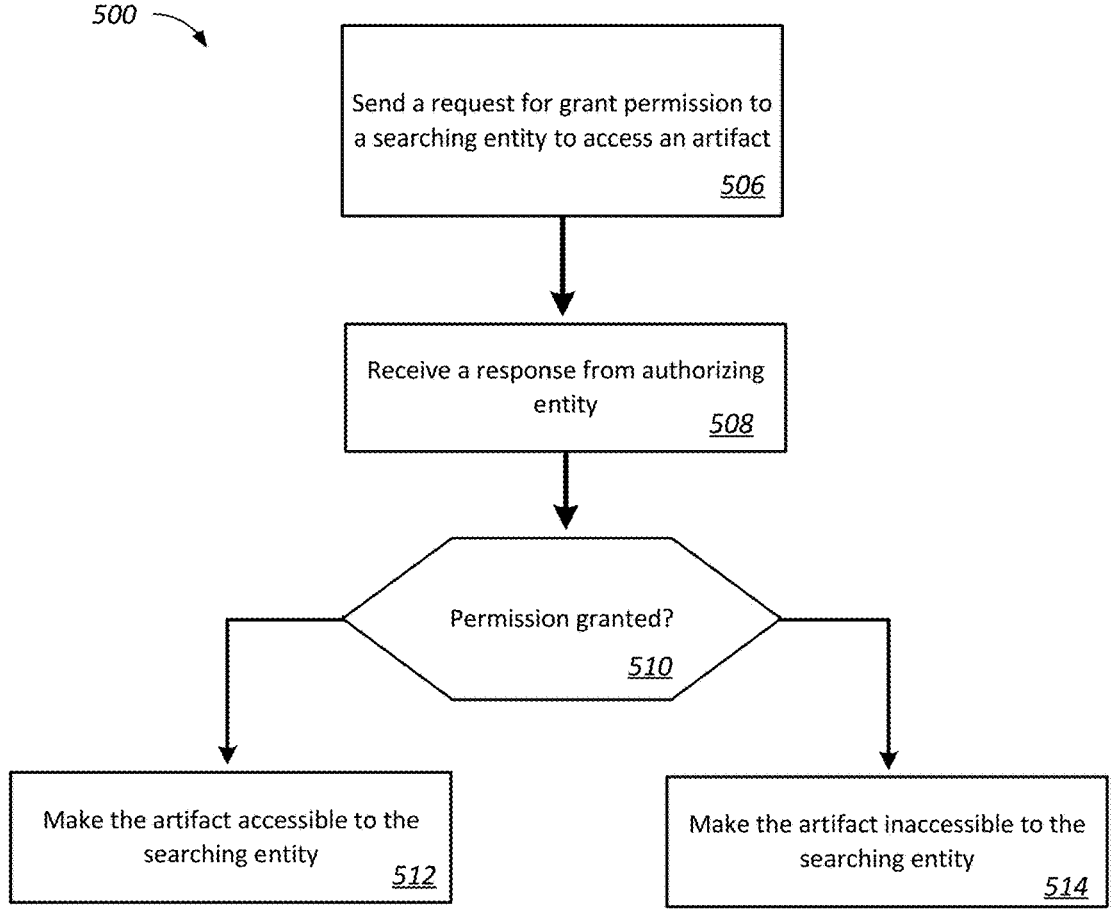
FIG. 5B is a flow chart illustrating an example process that requests permission for an entity to access an artifact in response to a search query issued by the entity.

FIG. 5B is a flow chart illustrating an example process 501 for requesting permission for an entity to access an artifact in response to a search query issued by the entity. The process 501 can be performed by a computer system comprising one or more computers, for example, the communications facility 100 as shown in FIG. 1.

The system makes a request to an authorizing entity to give permission to the first entity to access a particular artifact of the set of artifacts (506). For example, the second entity may be an owner of the particular artifact. In some implementations, the request may identify the searching entity that the system will be granting access to, so that the authorizing entity can decide whether or not it is appropriate for the searching entity to have access to the particular artifact. In some implementations, the request may be an email sent to the authorizing entity, or a SMS message sent to the authorizing entity, or another type of communication. In some examples, the request could be a telephone call to the authorizing entity, for example, an automated telephone call.

The system receives a response from the authorizing entity (508). The system determines, based on the response, whether a permission has been granted by the authorizing entity (510). In some implementations, the system may receive a response from the authorizing entity granting the permission to the entity to access the particular artifact, and make the particular artifact available to the entity (512). In some implementations, the system may receive a response from the second entity denying the permission to the entity to access the particular artifact, and remove the particular artifact from the set of artifacts (514).

In some implementations, the system may receive, from an owner of a particular artifact, a request to modify a permission attribute of the particular artifact. The system can then modify the permission attribute of the particular artifact. In some examples, the modified permission attribute indicates that the particular artifact is accessible to other entities when the particular artifact is responsive, above the threshold responsiveness value, to the search query issued by the entity. In some implementations, the system may receive, from an owner of multiple artifacts sharing a common attribute (e.g., artifacts all stored in the same directory of a storage system), a request to modify a permission attribute of the multiple artifacts, and the system may modify the permission attribute of the multiple artifacts, where the modified permission attribute indicates that some of the artifacts are accessible to the entity when the one or more artifacts are responsive, above the threshold responsiveness value, to the search query issued by the entity. The common attribute may be the presence of the artifacts in an artifact folder (e.g., a collection of artifacts, such as the directory on a file system) searchable by the entity.

In some implementations, the system may make the set of artifacts available to the entity. Using a user interface, the entity then may read, edit, overwrite, delete, copy, or process the content of the relevant artifacts as permitted by the permission attributes associated with these artifacts.

Figure 5C:
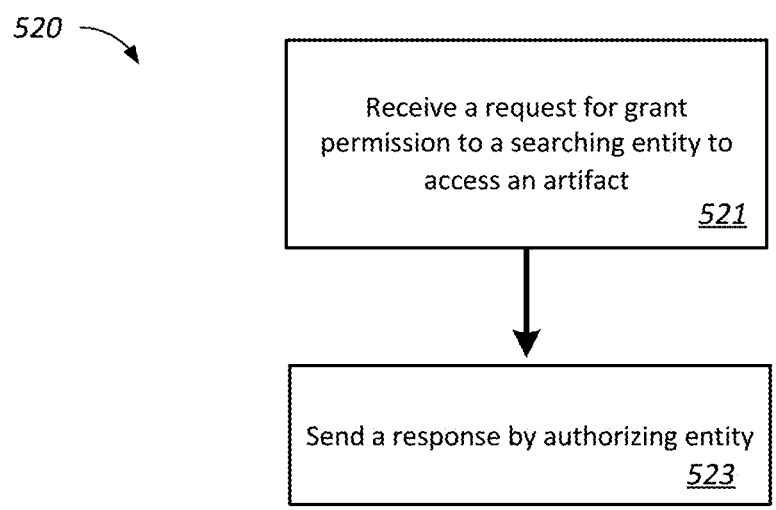
FIG. 5C is a flow chart illustrating an example process for receiving a request for an entity to access an artifact in response to a search query issued by the entity.

FIG. 5C is a flow chart illustrating an example process 520 for receiving a request for an entity to access an artifact in response to a search query issued by the entity. The process 520 can be performed by a computer system comprising one or more computers, for example, the authorizing entity 351 as shown in FIG. 3C.

The system receives a request to give permission to a searching entity to access a particular artifact of the set of artifacts (521). For example, the request may be sent by the communications facility 100. In some implementations, the request may identify the searching entity that the system will be granting access to. In some implementations, the request may be an email, or a SMS message, or another type of communication.

The system sends a response by the authorizing entity (523). The system sends a response indicating whether a permission has been granted by the authorizing entity. In some implementations, the system may send a response granting the permission to the searching entity to access the particular artifact, and make the particular artifact available to the searching entity. In some implementations, the system may send a response denying the permission to the searching entity to access the particular artifact.

In some implementations, the system may send a request to modify a permission attribute of the particular artifact. In some examples, the modified permission attribute indicates that the particular artifact is accessible to other entities when the particular artifact is responsive, above the threshold responsiveness value, to the search query issued by the entity. In some implementations, the system may send a request to modify a permission attribute of multiple artifacts sharing a common attribute (e.g., artifacts all stored in the same directory of a storage system), where the modified permission attribute indicates that some of the artifacts are accessible to the entity when the one or more artifacts are responsive, above the threshold responsiveness value, to the search query issued by the entity. The common attribute may be the presence of the artifacts in an artifact folder searchable by the entity.

In some implementations, the system may send a response making the set of artifacts available to the entity. Using a user interface, the entity then may read, edit, overwrite, delete, copy, or process the content of the relevant artifacts as permitted by the permission attributes associated with these artifacts.

FIG. 6 is a block diagram of an example computer system 600. For example, referring to FIG. 1, the communications facility 100 or a server forming a portion of the communications facility 100 could be an example of the system 600 described here, as could a computer system used by any of the users who access resources of the communications facility 100. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In some implementations, the processor 610 is a multi-threaded processor. In some implementations, the processor 610 is a quantum computer. The processor 610 is capable of processing instructions stored in the memory 620 or on the storage device 630. The processor 610 may execute operations such as creating and maintaining data archives 210a-d (FIG. 2).

The memory 620 stores information within the system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a solid-date drive, a flash drive, magnetic tape, or some other large capacity storage device. In some implementations, the storage device 630 may be a cloud storage device, e.g., a logical storage device including multiple physical storage devices distributed on a network and accessed using a network. In some implementations, the storage device may store long-term data, such as the artifacts 220a-d assigned to data archives 210a-d, as well as data representing the data archives 210a-d. The input/output device 640 provides input/output operations for the system 600. In some implementations, the input/output device 640 can include one or more of a network interface devices, e.g., an Ethernet card, a serial communication device, e.g., an RS-232 port, and/or a wireless interface device, e.g., an 802.11 card, a 3G wireless modem, a 4G wireless modem.

A network interface device allows the system 600 to communicate, for example, transmit and receive data such as artifacts 220a-d shown in FIG. 2. In some implementations, the input/output device can include driver devices configured to receive input data and send output data to other input/output devices, e.g., keyboard, printer and display devices 660. In some implementations, mobile computing devices, mobile communication devices, and other devices can be used.

A server (e.g., a server forming a portion of the communications facility 100 shown in FIG. 1) can be realized by instructions that upon execution cause one or more processing devices to carry out the processes and functions described above, for example, sending and receiving artifacts 220a-d and assigning them to data archives 210a-d (FIG. 2). Such instructions can comprise, for example, interpreted instructions such as script instructions, or executable code, or other instructions stored in a computer readable medium. A communications facility 100 can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although an example processing system has been described in FIG. 6, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as software for creating and maintaining data archives 210a-d (FIG. 2), can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., forming a portion of a communications facility 100) is a general purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

The invention claimed is:

1. A computer-implemented method for sharing artifacts in a permission-protected archive, each artifact having a set of permission attributes including at least an access permission attribute used to determine accessibility to the artifact based on the identity of an entity seeking access to the artifact, the method comprising:

receiving, in response to a search query issued by an entity, a list of artifacts stored in the archive that are initially inaccessible to the entity based on the identity of the entity and the access permission attribute associated with each of the artifacts, wherein each of the artifacts comprises at least a fragment of data that forms an electronic communication;

identifying, among the list of initially inaccessible artifacts, a set of artifacts each having a distinct search permission attribute having an associated search permission value, the search permission attribute indicating that the respective artifact is made accessible to the entity when the respective artifact is responsive, above a threshold responsiveness value, to the search query issued by the entity, wherein the responsiveness value of an artifact is determined by its relevance to the search query and the threshold responsiveness value is based on the search permission value associated with the search permission attribute, wherein the respective artifact includes an electronic message and the search permission attribute includes a header field of the electronic message;

determining whether a particular artifact of the list of artifacts meets or exceeds the threshold responsiveness value, the determination based on a responsiveness score determined by a search engine to which the search query was provided, the responsiveness score assigned to the particular artifact based, at least in part, on at least one of a number of keywords in the particular artifact that match terms of the search query, a popularity of the particular artifact, a creation date of the particular artifact, or a data type of the particular artifact;

receiving, from an authorizing entity of a particular artifact, a request to modify the search permission attribute of the particular artifact;

modifying the search permission attribute of the particular artifact, wherein the modified search permission attribute indicates that the particular artifact is accessible to the entity when the particular artifact is responsive, above the threshold responsiveness value, to the search query issued by the entity;

receiving, from an authorizing entity of multiple artifacts sharing a common attribute, a request to modify a common search permission attribute of the multiple artifacts; and modifying the common search permission attribute of the multiple artifacts, wherein the modified search permission attribute indicates that one or more artifacts of the multiple artifacts are accessible to the entity when the one or more artifacts are responsive, above the threshold responsiveness value, to the search query issued by the entity.

2. The method of claim 1, wherein identifying a set of artifacts further comprises:

identifying, among the list of artifacts, an initial set of artifacts each having an access permission attribute indicating that the respective artifact is not accessible to the entity;

determining that one or more artifacts of the initial set of artifacts are responsive, above the threshold responsiveness value, to the search query, wherein the one or more artifacts each having the search permission attribute indicating that the respective artifact is accessible to the entity when the respective artifact is responsive, above the threshold responsiveness value, to the search query; and in response to determining that the one or more artifacts are responsive, above the threshold responsiveness value, to the search query, identifying the one or more artifacts as the set of artifacts each having a search permission attribute indicating that the respective artifact is accessible to the entity.

3. The method of claim 1, comprising making the set of artifacts available to the entity.

4. The method of claim 1, comprising making a request to a second entity to give permission to the entity to access a particular artifact of the set of artifacts, the second entity identified as an authorizing entity of the particular artifact.

5. The method of claim 4, comprising:
receiving a response from the second entity granting the permission to the entity to access the particular artifact; and
making the particular artifact available to the entity.

6. The method of claim 4, comprising:
receiving a response from the second entity denying the permission to the entity to access the particular artifact; and
removing the particular artifact from the set of artifacts.

7. The method of claim 1, wherein the common attribute includes an artifact folder searchable by the entity.

8. A system comprising:
one or more computers and non-transitory a machine-readable storage system storing a portion of data that forms an electronic communication, the portion of data associated with a permission attribute, the permission attribute indicating one or more of several permission states, the permission states including
a) a browsing state making the portion of data available to an entity based on an access permission attribute when the entity is browsing a file system; and
b) a searching state making the portion of data available to an entity based on a distinct search permission attribute when the entity performs a search query to which the portion of data is responsive, above a threshold responsiveness value, to the search query, wherein the responsiveness value of the portion of data is determined by its relevance to the search query,
wherein the threshold responsiveness value is based on a search permission value associated with the search permission attribute, wherein the portion of data includes an electronic message and the permission attribute includes a header field of the electronic message,
wherein the determination is based on a responsiveness score determined by a search engine to which the search query was provided, the responsiveness score is assigned to the portion of data based, at least in part, on at least one of a number of keywords in the portion of data that match terms of the search query, a popularity of the portion of data, a creation date of the portion of data, or a data type of the particular portion of data;
wherein a search permission attribute of a portion of data is modified based on a request received from an authorizing entity of that particular portion of data, wherein the modified permission attribute indicates that the particular portion of data is accessible to the entity when the particular portion of data is responsive, above the threshold responsiveness value, to the search query issued by the entity; and
wherein a common search permission attribute of multiple artifacts sharing a common attribute is modified based on a request received from an authorizing entity of the multiple artifacts sharing the common attribute, wherein the modified common search permission attribute indicates that one or more artifacts of the multiple artifacts are accessible to the entity when the one or more artifacts are responsive, above the threshold responsiveness value, to the search query issued by the entity.

9. A computer-implemented method comprising:
after identifying that a first artifact, which comprises at least a fragment of data that forms an electronic communication including an electronic message, is responsive, above a threshold responsiveness value, to a particular search query issued by a searching entity, the first artifact having a distinct search permission attribute including a header field of the electronic message that indicates the first artifact is accessible to an entity when (i) the first artifact is responsive, above the threshold responsiveness value, to a search query issued by the entity, and (ii) permission to access is granted by an authorizing entity of the first artifact, wherein the identification that the first artifact is responsive above the threshold responsiveness value is based on a responsiveness score determined by a search engine to which the search query was provided, the responsiveness score assigned to the first artifact based, at least in part, on at least one of a number of keywords in the first artifact that match terms of the search query, a popularity of the first artifact, a creation date of the first artifact, or a data type of the first artifact:
sending a request, by the authorizing entity, specifying the search permission value associated with the search permission attribute of the first artifact;
receiving, by the authorizing entity, a request to grant permission to the searching entity to access the first artifact, wherein the first artifact is responsive, above the threshold responsiveness value, to the particular search query issued by the searching entity wherein the responsiveness value of an artifact is determined by its relevance to the search query;
sending a response, by the authorizing entity, granting the permission to the searching entity to access the first artifact;
receiving, from the authorizing entity of a particular artifact, a request to modify the search permission attribute of the particular artifact;
modifying the search permission attribute of the particular artifact, wherein the modified search permission attribute indicates that the particular artifact is accessible to the entity when the particular artifact is responsive, above the threshold responsiveness value, to the search query issued by the entity;
receiving, from an authorizing entity of multiple artifacts sharing a common attribute, a request to modify a common search permission attribute of the multiple artifacts; and
modifying the common search permission attribute of the multiple artifacts, wherein the modified common search permission attribute indicates that one or more artifacts of the multiple artifacts are accessible to the entity when the one or more artifacts are responsive, above the threshold responsiveness value, to the search query issued by the entity.

10. The method of claim 9, wherein sending a response granting the permission to the searching entity to access the first artifact comprises sending the response granting permission to the searching entity to access one or more other artifacts of the authorizing entity having the search permission attribute.

11. A computer-implemented method comprising:
in response to issuing a particular search query, receiving access to a first artifact, which comprises at least a portion of data that forms an electronic communication including an electronic message and has a distinct search permission attribute including a header field of the electronic message indicating that the first artifact is accessible to an entity when (i) the first artifact is responsive, above a threshold responsiveness value, to a search query issued by the entity, wherein the threshold responsiveness value is based on a search permission value associated with the search permission attribute, and (ii) permission to access is granted by an authorizing entity of the particular artifact, wherein the first artifact is responsive, above the threshold responsiveness value, to the particular search query;

wherein the responsiveness value of an artifact is determined by its relevance to the search query;

wherein determination that the first artifact is responsive above the threshold responsiveness value is based on a responsiveness score determined by a search engine to which the search query was provided, the responsiveness score assigned to the first artifact based, at least in part, on at least one of a number of keywords in the first artifact that match terms of the search query, a popularity of the first artifact, a creation date of the first artifact, or a data type of the first artifact;

wherein the authorizing entity has granted the permission to access the first artifact in response to a request;

wherein the search permission attribute of the portion of data is modified based on a request received from an authorizing entity of that particular portion of data, wherein the modified search permission attribute indicates that the particular portion of data is accessible to the entity when the particular portion of data is responsive, above the threshold responsiveness value, to the search query issued by the entity; and wherein a common search permission attribute of multiple artifacts sharing a common attribute is modified based on a request received from an authorizing entity of the multiple artifacts sharing the common attribute, wherein the modified common search permission attribute indicates that one or more artifacts of the multiple artifacts are accessible to the entity when the one or more artifacts are responsive, above the threshold responsiveness value, to the search query issued by the entity.

12. The method of claim 11, further comprising:
receiving access to a second artifact having a distinct search permission attribute indicating that the second artifact is accessible to an entity when the second artifact is responsive, above a threshold responsiveness value, to a search query issued by the entity,
wherein the second artifact is responsive, above the threshold responsiveness value, to the particular search query.

13. A non-transitory computer-readable medium storing software having stored thereon instructions, which, when executed by one or more computers, cause the one or more computers to perform operations of:
receiving a list of initially inaccessible artifacts stored in an archive, the artifacts being responsive to a search query issued by an entity, wherein each of the artifacts comprises at least a fragment of data that forms an electronic communication;
identifying, among the list of initially inaccessible artifacts, a set of artifacts each having a distinct search permission attribute indicating that the respective artifact is made accessible to the entity when the respective artifact is responsive, above a threshold responsiveness value, to the search query issued by the entity, wherein the responsiveness value of an artifact is determined by its relevance to the search query and the threshold responsiveness value is based on a search permission value associated with the search permission attribute, wherein each artifact of the set of artifacts includes an electronic message and the permission attribute includes a header field of the electronic message;
determining whether a particular artifact of the list of artifacts meets or exceeds the threshold responsiveness value, the determination based on a responsiveness score determined by a search engine to which the search query was provided, the responsiveness score assigned to the particular artifact based, at least in part, on at least one of a number of keywords in the particular artifact that match terms of the search query, a popularity of the particular artifact, a creation date of the particular artifact, or a data type of the particular artifact;
receiving, from an authorizing entity of a particular artifact, a request to modify the search permission attribute of the particular artifact;
modifying the search permission attribute of the particular artifact, wherein the modified search permission attribute indicates that the particular artifact is accessible to the entity when the particular artifact is responsive, above the threshold responsiveness value, to the search query issued by the entity;
receiving, from an authorizing entity of multiple artifacts sharing a common attribute, a request to modify a common search permission attribute of the multiple artifacts; and
modifying the common search permission attribute of the multiple artifacts, wherein the modified common search permission attribute indicates that one or more artifacts of the multiple artifacts are accessible to the entity when the one or more artifacts are responsive, above the threshold responsiveness value, to the search query issued by the entity.

14. A system comprising:
one or more computers and one or more storage devices storing instructions that are operable, when executed by the one or more computers, to cause the one or more computers to perform operations comprising:
receiving a list of initially inaccessible artifacts stored in an archive, the artifacts being responsive to a search query issued by an entity, wherein each of the artifacts comprises at least a fragment of data that forms an electronic communication;
identifying, among the list of initially inaccessible artifacts, a set of artifacts each having a distinct search permission attribute indicating that the respective artifact is made accessible to the entity when the respective artifact is responsive, above a threshold responsiveness value, to the search query issued by the entity, wherein the responsiveness value of an artifact is determined by its relevance to the search query and the threshold responsiveness value is based on a search permission value associated with the search permission attribute, wherein each artifact of the set of artifacts includes an electronic message and the search permission attribute includes a header field of the electronic message;
determining whether a particular artifact of the list of artifacts meets or exceeds the threshold responsiveness value, the determination based on a responsiveness score determined by a search engine to which the search query was provided, the responsiveness score assigned to the particular artifact based, at least in part, on at least one of a number of keywords in the particular artifact that match terms of the search query, a popularity of the particular artifact, a creation date of the particular artifact, or a data type of the particular artifact;

receiving, from an authorizing entity of a particular artifact, a request to modify the search permission attribute of the particular artifact;

modifying the search permission attribute of the particular artifact, wherein the modified search permission attribute indicates that the particular artifact is accessible to the entity when the particular artifact is responsive, above the threshold responsiveness value, to the search query issued by the entity;

receiving, from an authorizing entity of multiple artifacts sharing a common attribute, a request to modify a common search permission attribute of the multiple artifacts; and modifying the common search permission attribute of the multiple artifacts, wherein the modified common search permission attribute indicates that one or more artifacts of the multiple artifacts are accessible to the entity when the one or more artifacts are responsive, above the threshold responsiveness value, to the search query issued by the entity.

15. A non-transitory computer-readable medium storing software having stored thereon instructions, which, when executed by one or more computers, cause the one or more computers to perform operations of:

after identifying that a first artifact, which comprises at least a fragment of data that forms an electronic communication including an electronic message, is responsive, above a threshold responsiveness value, to a particular search query issued by a searching entity, the first artifact having a distinct search permission attribute including a header field of the electronic message that indicates the first artifact is accessible to an entity when (i) the first artifact is responsive, above the threshold responsiveness value, to a search query issued by the entity, wherein the threshold responsiveness value is based on a permission value associated with the permission attribute, and (ii) permission to access is granted by an authorizing entity of the first artifact, wherein the identification that the first artifact is responsive above the threshold responsiveness value is based on a responsiveness score determined by a search engine to which the search query was provided, the responsiveness score assigned to the first artifact based, at least in part, on at least one of a number of keywords in the first artifact that match terms of the search query, a popularity of the first artifact, a creation date of the first artifact, or a data type of the first artifact:

receiving, by the authorizing entity, a request to grant permission to the searching entity to access the first artifact, wherein the first artifact is responsive, above the threshold responsiveness value, to the particular search query issued by the searching entity;

sending a response, by the authorizing entity, granting the permission to the searching entity to access the first artifact;

receiving, from an authorizing entity of a particular artifact, a request to modify the search permission attribute of the particular artifact;

modifying the search permission attribute of the particular artifact, wherein the modified search permission attribute indicates that the particular artifact is accessible to the entity when the particular artifact is responsive, above the threshold responsiveness value, to the search query issued by the entity;

receiving, from an authorizing entity of multiple artifacts sharing a common attribute, a request to modify a common search permission attribute of the multiple artifacts; and modifying the common search permission attribute of the multiple artifacts, wherein the modified common search permission attribute indicates that one or more artifacts of the multiple artifacts are accessible to the entity when the one or more artifacts are responsive, above the threshold responsiveness value, to the search query issued by the entity.

16. A system comprising:

one or more computers and one or more storage devices storing instructions that are operable, when executed by the one or more computers, to cause the one or more computers to perform operations comprising:

after identifying that a first artifact, which comprises at least a fragment of data that forms an electronic communication including an electronic message, is responsive, above a threshold responsiveness value, to a particular search query issued by a searching entity, the first artifact having a distinct search permission attribute including a header field of the electronic message that indicates the first artifact is accessible to an entity when (i) the first artifact is responsive, above the threshold responsiveness value, to a search query issued by the entity, and (ii) permission to access is granted by an authorizing entity of the first artifact, wherein the identification that the first artifact is responsive above the threshold responsiveness value is based on a responsiveness score determined by a search engine to which the search query was provided, the responsiveness score assigned to the first artifact based, at least in part, on at least one of a number of keywords in the first artifact that match terms of the search query, a popularity of the first artifact, a creation date of the first artifact, or a data type of the first artifact:

sending a request, by the authorizing entity, specifying the search permission value associated with the search permission attribute of the first artifact;

receiving, by the authorizing entity, a request to grant permission to the searching entity to access the first artifact, wherein the first artifact is responsive, above the threshold responsiveness value, to the particular search query issued by the searching entity, wherein the responsiveness value of an artifact is determined by its relevance to the search query;

sending a response, by the authorizing entity, granting the permission to the searching entity to access the first artifact;

receiving, from an authorizing entity of a particular artifact, a request to modify the search permission attribute of the particular artifact;

modifying the search permission attribute of the particular artifact, wherein the modified search permission attribute indicates that the particular artifact is accessible to the entity when the particular artifact is responsive, above the threshold responsiveness value, to the search query issued by the entity;

receiving, from an authorizing entity of multiple artifacts sharing a common attribute, a request to modify a common search permission attribute of the multiple artifacts; and modifying the common search permission attribute of the multiple artifacts, wherein the modified common search permission attribute indicates that one or more artifacts of the multiple artifacts are accessible to the entity when the one or more artifacts are responsive, above the threshold responsiveness value, to the search query issued by the entity.

17. A non-transitory computer-readable medium storing software having stored thereon instructions, which, when executed by one or more computers, cause the one or more computers to perform operations of:
- in response to issuing a particular search query, receiving access to a first artifact, which comprises at least a portion of data that forms an electronic communication including an electronic message and has a distinct search permission attribute including a header field of the electronic message indicating that the first artifact is accessible to an entity when (i) the first artifact is responsive, above a threshold responsiveness value, to a search query issued by the entity, wherein the threshold responsiveness value is based on a search permission value associated with the search permission attribute, and (ii) permission to access is granted by an authorizing entity of the particular artifact, wherein the first artifact is responsive, above the threshold responsiveness value, to the particular search query;
- wherein the responsiveness value of an artifact is determined by its relevance to the search query;
- wherein determination that the first artifact is responsive above the threshold responsiveness value is based on a responsiveness score determined by a search engine to which the search query was provided, the responsiveness score assigned to the first artifact based, at least in part, on at least one of a number of keywords in the first artifact that match terms of the search query, a popularity of the first artifact, a creation date of the first artifact, or a data type of the first artifact;
- wherein the authorizing entity has granted the permission to access the first artifact in response to a request;
- wherein the search permission attribute of the portion of data is modified based on a request received from an authorizing entity of that particular portion of data, wherein the modified search permission attribute indicates that the particular portion of data is accessible to the entity when the particular portion of data is responsive, above the threshold responsiveness value, to the search query issued by the entity; and
- wherein a common search permission attribute of multiple artifacts sharing a common attribute is modified based on a request received from an authorizing entity of the multiple artifacts sharing the common attribute and the permission attribute is modified, wherein the modified common search permission attribute indicates that one or more artifacts of the multiple artifacts are accessible to the entity when the one or more artifacts are responsive, above the threshold responsiveness value, to the search query issued by the entity.

18. A system comprising:
- one or more computers and one or more storage devices storing instructions that are operable, when executed by the one or more computers, to cause the one or more computers to perform operations comprising:
- in response to issuing a particular search query, receiving access to a first artifact, which comprises at least a portion of data that forms an electronic communication including an electronic message and has a distinct search permission attribute including a header field of the electronic message indicating that the first artifact is accessible to an entity when (i) the first artifact is responsive, above a threshold responsiveness value, to a search query issued by the entity, wherein the threshold responsiveness value is based on a search permission value associated with the search permission attribute, and (ii) permission to access is granted by an authorizing entity of the particular artifact, wherein the first artifact is responsive, above the threshold responsiveness value, to the particular search query;
- wherein the responsiveness value of an artifact is determined by its relevance to the search query;
- wherein determination that the first artifact is responsive above the threshold responsiveness value is based on a responsiveness score determined by a search engine to which the search query was provided, the responsiveness score assigned to the first artifact based, at least in part, on at least one of a number of keywords in the first artifact that match terms of the search query, a popularity of the first artifact, a creation date of the first artifact, or a data type of the first artifact;
- wherein the authorizing entity has granted the permission to access the first artifact in response to a request;
- wherein the search permission attribute of the portion of data is modified based on a request received from an authorizing entity of that particular portion of data, wherein the modified search permission attribute indicates that the particular portion of data is accessible to the entity when the particular portion of data is responsive, above the threshold responsiveness value, to the search query issued by the entity; and
- wherein a common search permission attribute of multiple artifacts sharing a common attribute is modified based on a request received from an authorizing entity of the multiple artifacts sharing the common attribute and the permission attribute is modified, wherein the modified common search permission attribute indicates that one or more artifacts of the multiple artifacts are accessible to the entity when the one or more artifacts are responsive, above the threshold responsiveness value, to the search query issued by the entity.

* * * * *